(12) United States Patent
Sato et al.

(10) Patent No.: US 11,514,443 B2
(45) Date of Patent: Nov. 29, 2022

(54) OPERATION MANAGEMENT METHOD, OPERATION MANAGEMENT SYSTEM, AND OPERATION MANAGEMENT PROGRAM

(71) Applicant: HITACHI, LTD., Tokyo (JP)

(72) Inventors: Tatsuya Sato, Tokyo (JP); Takayuki Nagai, Tokyo (JP); Jun Nemoto, Tokyo (JP); Nishio Yamada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 305 days.

(21) Appl. No.: 16/632,935

(22) PCT Filed: Jul. 9, 2018

(86) PCT No.: PCT/JP2018/025834
§ 371 (c)(1),
(2) Date: Jan. 22, 2020

(87) PCT Pub. No.: WO2019/021792
PCT Pub. Date: Jan. 31, 2019

(65) Prior Publication Data
US 2020/0151715 A1    May 14, 2020

(30) Foreign Application Priority Data

Jul. 26, 2017    (JP) .............................. JP2017-144223

(51) Int. Cl.
*G06Q 20/38* (2012.01)
*G06F 16/27* (2019.01)
*G06F 16/23* (2019.01)

(52) U.S. Cl.
CPC ....... *G06Q 20/389* (2013.01); *G06F 16/2379* (2019.01); *G06F 16/27* (2019.01)

(58) Field of Classification Search
CPC ........ G06F 16/2379; G06F 16/27; G06F 9/46; G06Q 20/389; G06Q 10/06; G06Q 20/3829; G06Q 20/401
See application file for complete search history.

(56) References Cited

U.S. PATENT DOCUMENTS

| 10,871,948 B1* | 12/2020 | Dowling | ................ G06Q 20/02 |
| 2018/0096175 A1* | 4/2018 | Schmeling | .............. B29C 64/10 |

OTHER PUBLICATIONS

Yoshiki et al., "One consideration for managing certificates in consortium chain", 2017 Symposium on Cryptography and Information Security.

(Continued)

*Primary Examiner* — Scott S Trotter
(74) *Attorney, Agent, or Firm* — Mattingly & Malur, PC

(57) ABSTRACT

Operation management with consistent policies and timings between nodes even in a situation where there are a plurality of administrators in the distributed ledger system is realized. In an operation management system 10 for a distributed ledger system 6 comprising a plurality of nodes, each of at least two or more predetermined nodes in the plurality of nodes manages an operation smart contract 372 for operation management of the distributed ledger system with a distributed ledger 37, when at least one node in the two or more predetermined nodes receives a transaction, the node which has received the transaction judges whether or not a type of the transaction is the operation smart contract 372, and, based on the judgment result, executes the operation smart contract 372.

13 Claims, 25 Drawing Sheets

(56) References Cited

OTHER PUBLICATIONS

Satoshi Nakamoto, Bitcoin: A Peer-to-Peer Electronic Cash System, online retrieved on Mar. 1, 2017, Internet <URL: https://bitcoin.org/bitcoin.pdf>.
"Ethereum White Paper", online retrieved on Mar. 1, 2017, Internet <URL: https://github.com/ethereum/wiki/wiki/[English]-White-Paper>.
"Hyperledger Fabric", online retrieved on Mar. 31, 2017, Internet <URL:http://hyperledger-fabric.readthedocs.io/en/latest/>.
International Search Report of PCT/JP2018/025834 dated Sep. 25, 2018.

\* cited by examiner

DISTRIBUTED LEDGER 37 (STATE INFORMATION)

| CONTRACT TYPE 37301 | CONTRACT ID 37302 | SUBSTANCE OF CONTRACT 37303 | INTERNAL TABLE 37304 |
|---|---|---|---|
| BUSINESS | FREIGHT TRANSPORTATION CONTRACT | \<BINARY\> | 3720: <table><tr><th>FREIGHT ID</th><th>TIME</th><th>STATE</th><th>BUSINESS</th><th>MAXIMUM FREIGHT</th><th>CONTRACT</th><th>PENALTY</th></tr><tr><td>...</td><td>...</td><td>...</td><td>...</td><td>...</td><td>...</td><td>...</td></tr><tr><td>123</td><td>2016/09/01 10:00</td><td>ARRIVED AT STOPOVER</td><td>TRANSPORTER A</td><td>60%</td><td>COMPLY</td><td>0</td></tr><tr><td>...</td><td>...</td><td>...</td><td>...</td><td>...</td><td>...</td><td>...</td></tr><tr><td>125</td><td>2016/09/03 12:00</td><td>SHIPPING COMPLETED</td><td>RETAILER A</td><td>70%</td><td>COMPLY</td><td>0</td></tr><tr><td>...</td><td>...</td><td>...</td><td>...</td><td>...</td><td>...</td><td>...</td></tr><tr><td>234</td><td>2016/09/04 12:30</td><td>ARRIVED AT STOPOVER</td><td>TRANSPORTER B</td><td>85%</td><td>BREACH</td><td>2000</td></tr><tr><td>...</td><td>...</td><td>...</td><td>...</td><td>...</td><td>...</td><td>...</td></tr></table> |
| ... | ... | ... | ... |
| SYSTEM OPERATION | LEDGER DATA BACKUP | \<BINARY\> | 3721: <table><tr><th>DEFINITION ID</th><th>DEFINITION TIME</th><th>OPERATOR</th><th>EXECUTION FREQUENCY</th></tr><tr><td>...</td><td>...</td><td>...</td><td>...</td></tr><tr><td>BACKUP_1</td><td>2016/07/01 11:00</td><td>A, B, C, D</td><td>EVERY 1 HOUR</td></tr><tr><td>...</td><td>...</td><td>...</td><td>...</td></tr></table><br><table><tr><th>EXECUTION ID</th><th>DEFINITION ID</th><th>EXECUTION START TIME</th><th>EXECUTION STATE</th><th>EXECUTION COMPLETION TIME</th></tr><tr><td>...</td><td>...</td><td>...</td><td>...</td><td>...</td></tr><tr><td>11</td><td>BACKUP_1</td><td>2016/09/01 11:00</td><td>EXECUTION COMPLETED</td><td>2016/09/01 11:01</td></tr><tr><td>...</td><td>...</td><td>...</td><td>...</td><td>...</td></tr><tr><td>21</td><td>BACKUP_1</td><td>2016/09/03 13:00</td><td>EXECUTING</td><td>—</td></tr><tr><td>...</td><td>...</td><td>...</td><td>...</td><td>...</td></tr></table> |
| ... | ... | ... | ... |

FIG. 5

OPERATION MANAGEMENT METHOD, OPERATION MANAGEMENT SYSTEM, AND OPERATION MANAGEMENT PROGRAM

TECHNICAL FIELD

The present invention relates to an operation management method, an operation management system, and an operation management program, and more specifically to a technology enabling operation management in which policies and timings are adjusted between nodes even in a situation where a plurality of administrators exist in a distributed ledger system.

BACKGROUND ART

Traditionally, most of various transactions have been implemented via reliable centralized authorities such as financial institutions and governments. However, in recent years, P2P (Peer to Peer) transactions between users have been proposed, which is different from the traditional transaction form, and there is a distributed ledger technology as a means of implementing the transaction.

As an example of such a distributed ledger technology, there is a technology for performing a settlement transaction without using a centralized agency such as a bank using a virtual currency called a Bitcoin. See Non-Patent Literature 1. With regard to Bitcoins, for a transaction data (hereinafter also referred to as a transaction) on a P2P network, a node called a miner determines its validity and performs a confirmation process by a specific work called a proof of work that is calculation of a hash value.

Transactions that have been determined as described above are grouped into one block and described in a distributed ledger called block chain (hereinafter also referred to as BC) at each node.

On the other hand, based on BC implemented by the above Bitcoin technology, various derivation techniques related to BC and distributed ledger are further proposed and continue to evolve.

The main features of the current BC are (1) to confirm the transaction by consensus formation and approval by arbitrary or specific participants rather than the centralized agency in transactions among participants on a business network, 2) to summarize a plurality of transactions as a block, to record it in a distributed ledger in a daisy-chain manner and to hash calculation to consecutive blocks so that tampering is substantially impossible, and (3) to enable confirmation of the transaction with all the participants by sharing identical ledger data with all the participants, and the like.

By using the infrastructure that provides such a distributed ledger (hereinafter referred to as a distributed ledger base), it is possible to share and trade information among multiple entities without management by a centralized agency. For example, the entities may include multiple companies related to a consortium or supply chain in a specific business area. Here, a network constituted by participants (and their nodes) participating in the distributed ledger is called a business network.

Based on the above characteristics, applications of the distributed ledger technology including the BC mentioned above is being studied as a mechanism for managing/sharing trustworthy data and executing/managing transactions based on contracts in a wide variety of fields such as a financial and an IoT (Internet of Things) fields.

For example, in order to be applicable not only to simple virtual currency transactions such as Bitcoins, but also to complex transaction conditions and various applications, it is becoming possible to manage logic as well as (transaction) data in the distributed ledger. This logic is called a Smart Contract (hereinafter also referred to as SC).

On the other hand, in the distributed ledger base having the execution function of SC (refer to Non-Patent Literatures 2 and 3), a transaction (hereinafter also referred to as TX) is accepted while consensus is formed at a predetermined consensus level between nodes and executed at each node to share the information (ledger) on multiple nodes. Also, the distributed ledger base has a Smart Contract (SC) execution function that executes predetermined logic for TX.

SUMMARY OF INVENTION

Technical Problem

In order to make the system constructed using the above-mentioned distributed ledger technique (hereinafter referred to as "distributed ledger system") to be put into operation, it is necessary to perform system operation management such as backup/restore of the ledger, halt of service, etc.) as the conventional system such as a Web system using a Web server and a DB server.

On the other hand, in the distributed ledger system, there are cases where a business network is constructed/operated by establishing a consortium etc. with multiple entities. In other words, the distributed ledger system can be constructed across multiple organizations.

In the case where the operation management method of the conventional system is applied to such a distributed ledger system, two methods are conceivable. A first method is that a single operator operates and manages all the nodes. A second method is that an operator of each node such as an owner of the node of each organization individually operates and manages the node.

When using the first method, there will be a problem that the operation is centralized, and the strength of the non-centralization, which was a feature of the BC system, diminishes. There also remains a problem that the method is not able to handle a multivendor operation. On the other hand, in the case of using the second method, since administrators and policies are different for each organization, there is a problem that the system is not able to be operated according to the same arrangement and timing. In the distributed ledger system, originally, there are backgrounds in which the administrator cannot access the nodes of other organizations, and the operation methods and policies are different among the organizations and cannot be executed according to the same arrangement or timing.

It is an object of the present invention to provide a technique for enabling operation management with consistent policies and timings between nodes even in a situation where there are a plurality of administrators in the distributed ledger system.

Solution to Problem

The operation management method according to the present invention for solving the above-mentioned problems of a distributed ledger system comprising a plurality of nodes, wherein:

each of at least two or more predetermined nodes in the plurality of nodes manages an operation smart contract for operation management of the distributed ledger system with a distributed ledger;

when at least one node in the two or more predetermined nodes receives a transaction, the node which has received the transaction judges whether or not a type of the transaction is the operation smart contract, and, based on the judgment result, executes the operation smart contract.

Further, an operation management system of the present invention comprising a plurality of nodes of a distributed ledger system, wherein:

each of at least two or more predetermined nodes in the plurality of nodes manages an operation smart contract for operation management of the distributed ledger system with a distributed ledger;

when at least one node in the two or more predetermined nodes receives a transaction, the node which has received the transaction judges whether or not a type of the transaction is the operation smart contract, and, based on the judgment result, executes the operation smart contract.

Further, an operation management program of the present invention for a distributed ledger system comprising a plurality of nodes, the operation management program causing:

each of at least two or more predetermined nodes in the plurality of nodes to manage an operation smart contract for operation management of the distributed ledger system with a distributed ledger;

when at least one node in the two or more predetermined nodes receives a transaction, the node which has received the transaction to judge whether or not a type of the transaction is the operation smart contract, and, based on the judgment result, to execute the operation smart contract.

Advantageous Effects of Invention

According to the present invention, operation management with consistent policies and timings between nodes are realized even in a situation where there are a plurality of administrators in the distributed ledger system.

BRIEF DESCRIPTION OF DRAWINGS

FIG. 5 is a diagram showing an example of a data structure of state information on a distributed ledger in the present embodiment.

EMBODIMENTS

Embodiment 1

Figure 1:
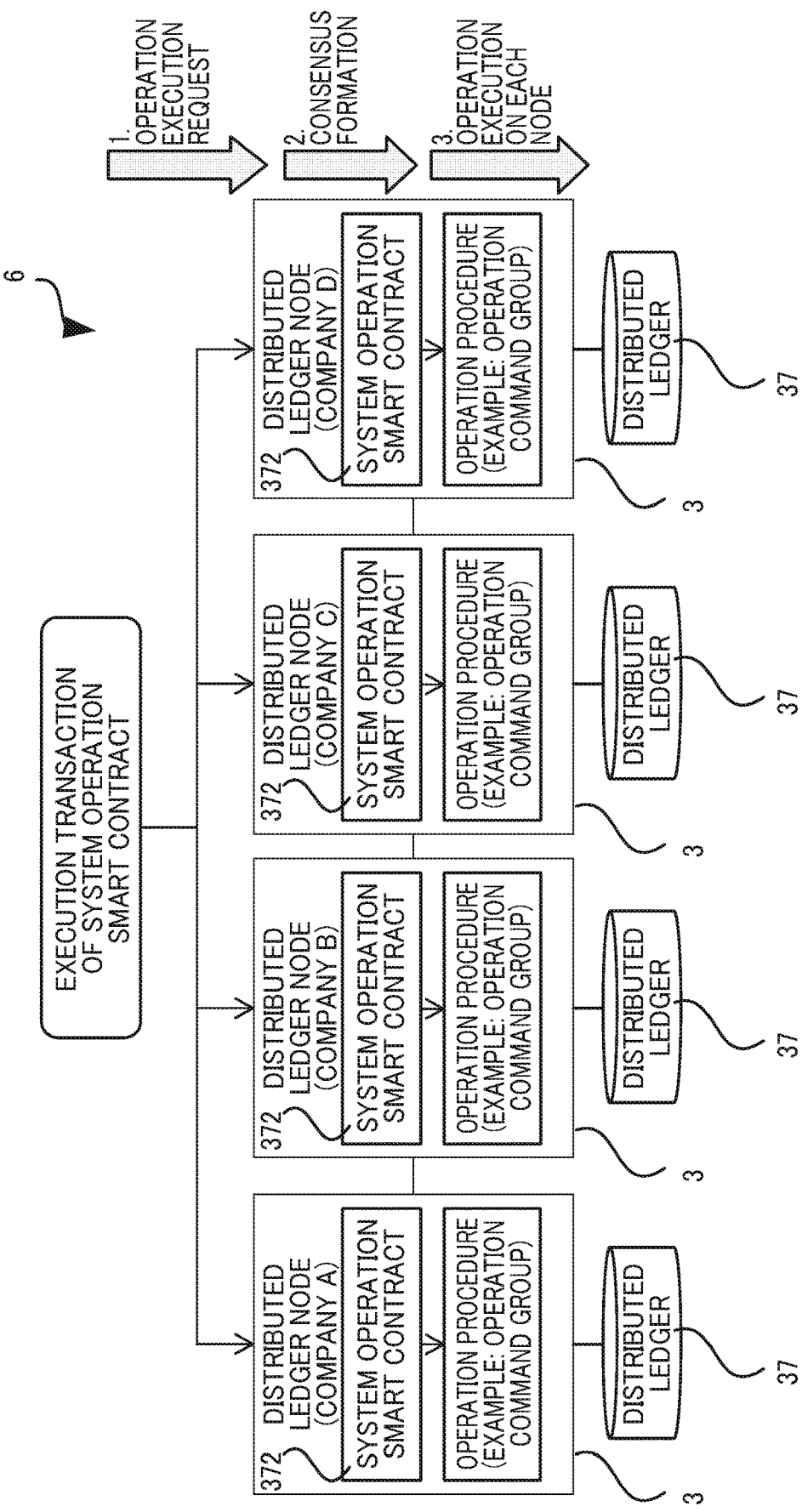
FIG. 1 is a diagram showing a basic concept of an operation management method according to the present embodiment.

FIG. 1 shows a basic concept of the operation management method of the present embodiment. In this embodiment, by handling the system operation work as TX or SC managed on the distributed ledger, the system operation work is performed while consensus is formed among the distributed ledger nodes 3 constituting the distributed ledger system 6.

Further, in this case, the distributed ledger system manages an operation smart contract 372 (hereinafter referred to as "system operation SC") for system operation work in each distributed ledger node 3, and is equipped with an operation execution function corresponding to the system operation SC, for example, an operation command, a management API function, a program or an agent that executes operation. In the present invention, a program that provides such a function is referred to as an operation execution program 36.

Here, as an example, when an execution TX of the system operation SC is issued as an operation execution request to the distributed ledger node 3 constituting the distributed ledger system 6, a consensus is formed for this TX among the distributed ledger nodes 3. After forming this consensus, the operation work is executed in accordance with the operation procedure such as an operation command group) defined in the system operation SC on each distributed ledger node 3. In this way, while performing consensus formation among a plurality of distributed ledger nodes, the operation work is executed in a non-centralized manner and concurrently.

Figure 2:
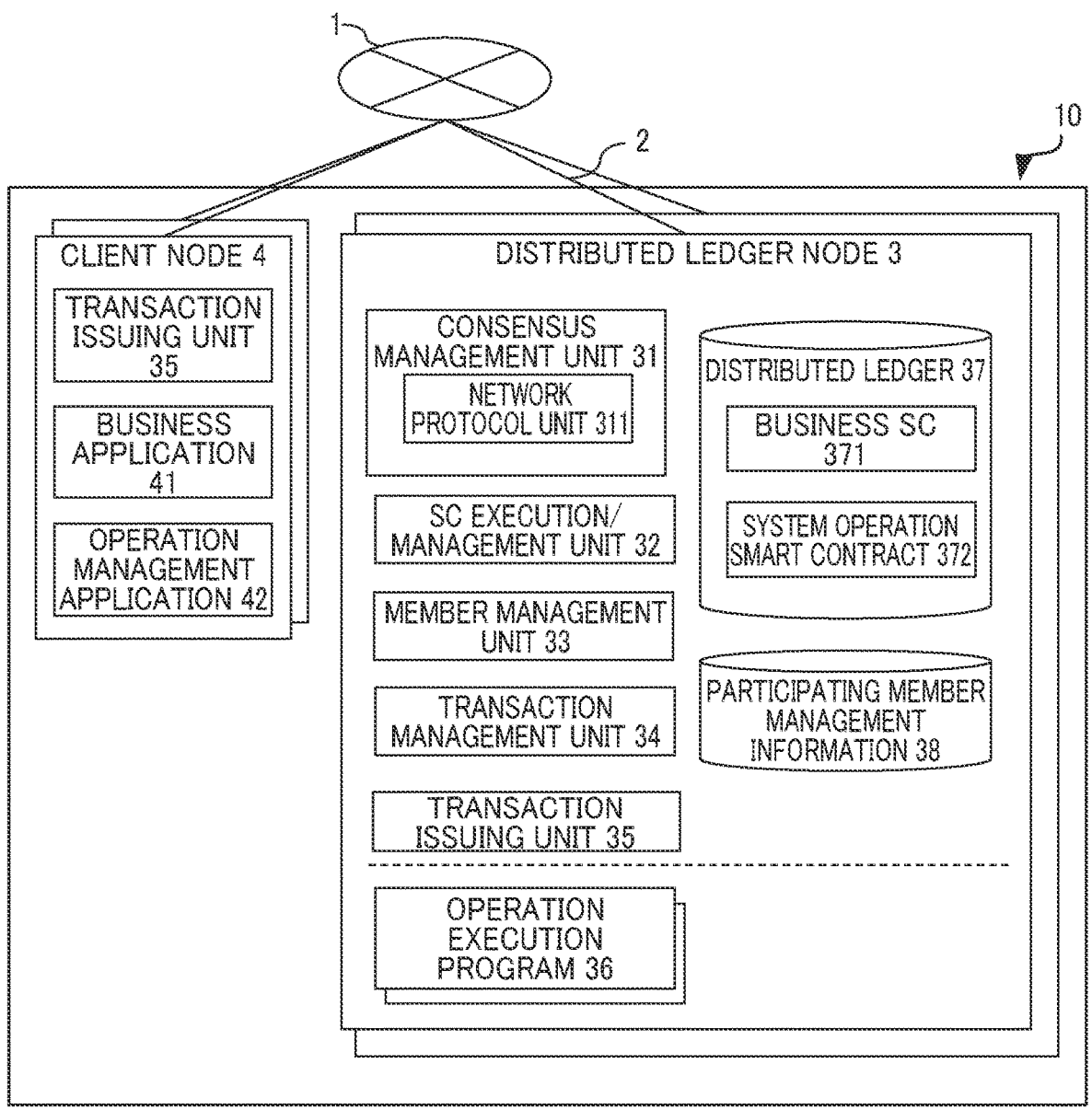
FIG. 2 is a diagram schematically showing an operation management system according to Embodiment 1.

A configuration example of a computer system that implements the above basic concept, that is, the operation management system 10 will be described. FIG. 2 is a diagram schematically showing the operation management system 10 according to Embodiment. 1

The illustrated operation management system 10 includes one or more distributed ledger nodes 3 and one or more client nodes 4. The system 10 can also be called a distributed ledger system. These devices are connected to a network 1 through a physical communication line 2.

The distributed ledger node 3 includes a consensus management unit 31, a smart contract execution/management unit 32 (hereinafter also referred to as SC execution/management unit 32), a member management unit 33, a transaction management unit 34, a transaction issuing unit 35, a distributed ledger 37, and participating member management information 38.

Among them, the consensus management unit 31 includes a network protocol unit 311. In addition, the distributed ledger node 3 accepts TX by the function of the transaction management unit 34, and forms a consensus as to whether to accept TX with the other node(s) by the function of the consensus management unit 31. Also, when the consensus is formed as described above, the distributed ledger node 3 executes deployment of the SC and the deployed SC via the function of the SC execution/management unit 32, records the history of TX and the execution result thereof in the distributed ledger 37.

Communication between the distributed ledger nodes 3 is performed by the function of the network protocol unit 311. In addition, the transaction management unit 34 of the distributed ledger node 3 provides a function/interface for accepting TX and obtaining/browsing history information of TX in response to a request from each node such as the client node 4. In this embodiment, it is assumed that the distributed ledger node 3 can issue TX. The issuance of various TXs via the transaction issuing unit 35.

The member management unit 33 of the distributed ledger node 3 provides new issuing and authentication functions of members participating in the business network. In member management, it is assumed that authentication of participating members, signature to TX, control of SC execution authority, etc. are performed using a pair of secret key and public key. The key information on such member management is stored and managed in the participating member management information 38.

When accepting the TX, the transaction management unit confirms whether the issuer of the TX is a correct participant with authority through the function of the member management unit 33 as occasion demands. Such a configuration itself may be appropriately chosen from known techniques, and a detailed description thereof will be omitted.

Further, the distributed ledger 37 stores and manages the ledger information related to the business-related SC (hereinafter, a business SC 371) and the system operation SC 372. As the data structure of this embodiment, it is assumed that the history of TX is BC and state information based on the execution result of TX is held in a table.

The operation execution program 36 in the distributed ledger node 3 is a program that executes the operation procedure defined in the system operation SC 372. Specifically, an operation command, a management API function, an operation script that describes combinations of those executions, an operation script that hides a platform-dependent portion, an agent that executes an operation management function, and the like are assumed.

The operation execution program 36 may be arranged in the distributed ledger node 3 in advance or may be arranged at the timing of deploying the system operation SC 372.

On the other hand, the client node 4 includes a transaction issuing unit 35, a business application 41, and an operation management application 42. The user of the SC or the provider issues various TXs via the transaction issuing unit 35 of the client node 4 and transmits it to each distributed ledger node 3.

Incidentally, issuer information is attached to TX, and as this information, authentication information (secret key) issued by participating member management information 38 is used. The business application 41 is an application that executes/manages the business process by issuing the TX related to the business SC 371 via the transaction issuing unit 35. The operation management application 42 is an application that executes/manages system operation work by issuing a TX related to the system operation SC 372 via the transaction issuing unit 35.

In the present embodiment, for example, it is assumed that there are a plurality of distributed ledger nodes 3 managed by different entities. The above-mentioned entities are, for example, businesses, organizations, and vendors. Likewise, it is assumed that there are a plurality of client nodes 4, and that a plurality of SC users utilize different client nodes 4, respectively. With respect to the client node 4, it is also possible for a plurality of SC users to share the client node 4 by changing authentication information to be assigned to the TX for each user.

Figure 3:
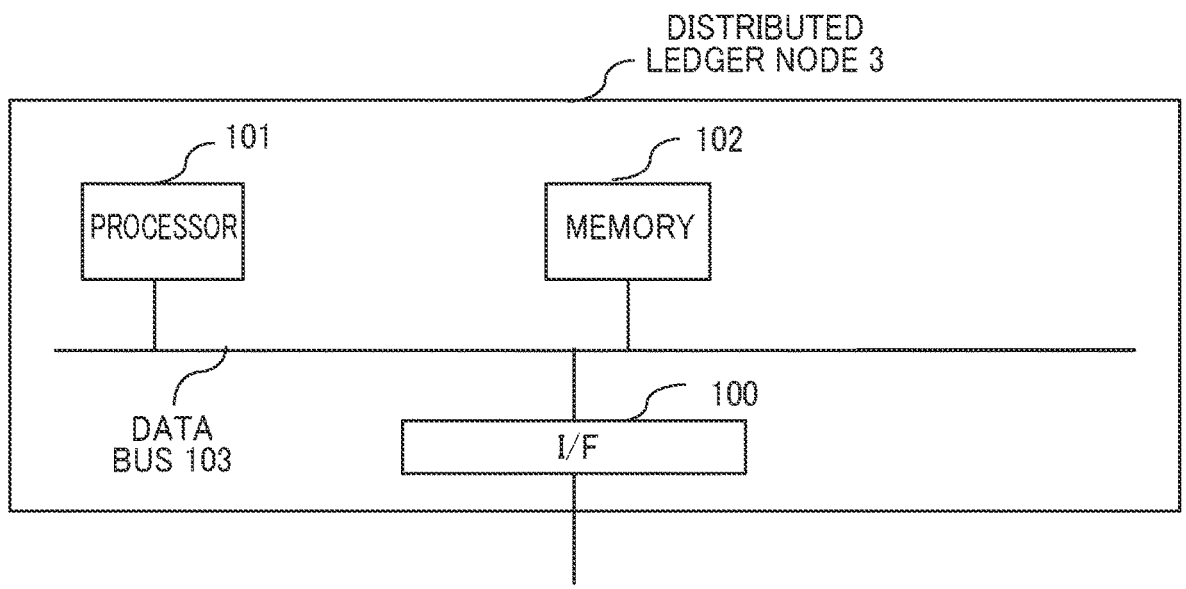
FIG. 3 is a block diagram showing a physical configuration of a distributed ledger node in Embodiment 1.

The physical configuration of the distributed ledger node 3 in Embodiment 1 will be described. FIG. 3 is a block diagram showing a physical configuration example of the distributed ledger node 3 in Embodiment 1.

The distributed ledger node 3 in the present embodiment is a computer including an interface (I/F) 100, a processor 101 as a computing device, and a memory 102 as a storage device.

The I/F 100, the processor 101, and the memory 102 are connected by a data bus 103.

The distributed ledger node 3 having such a structure communicates with the network 1 via the I/F 100. The processor 101 is a computing device such as a CPU. The memory 102 is a storage device for holding programs and data. The processor 101 reads the program 110 (operation management program) from the memory 102 via the data bus 103 and implements necessary functions by executing it.

Figure 4:
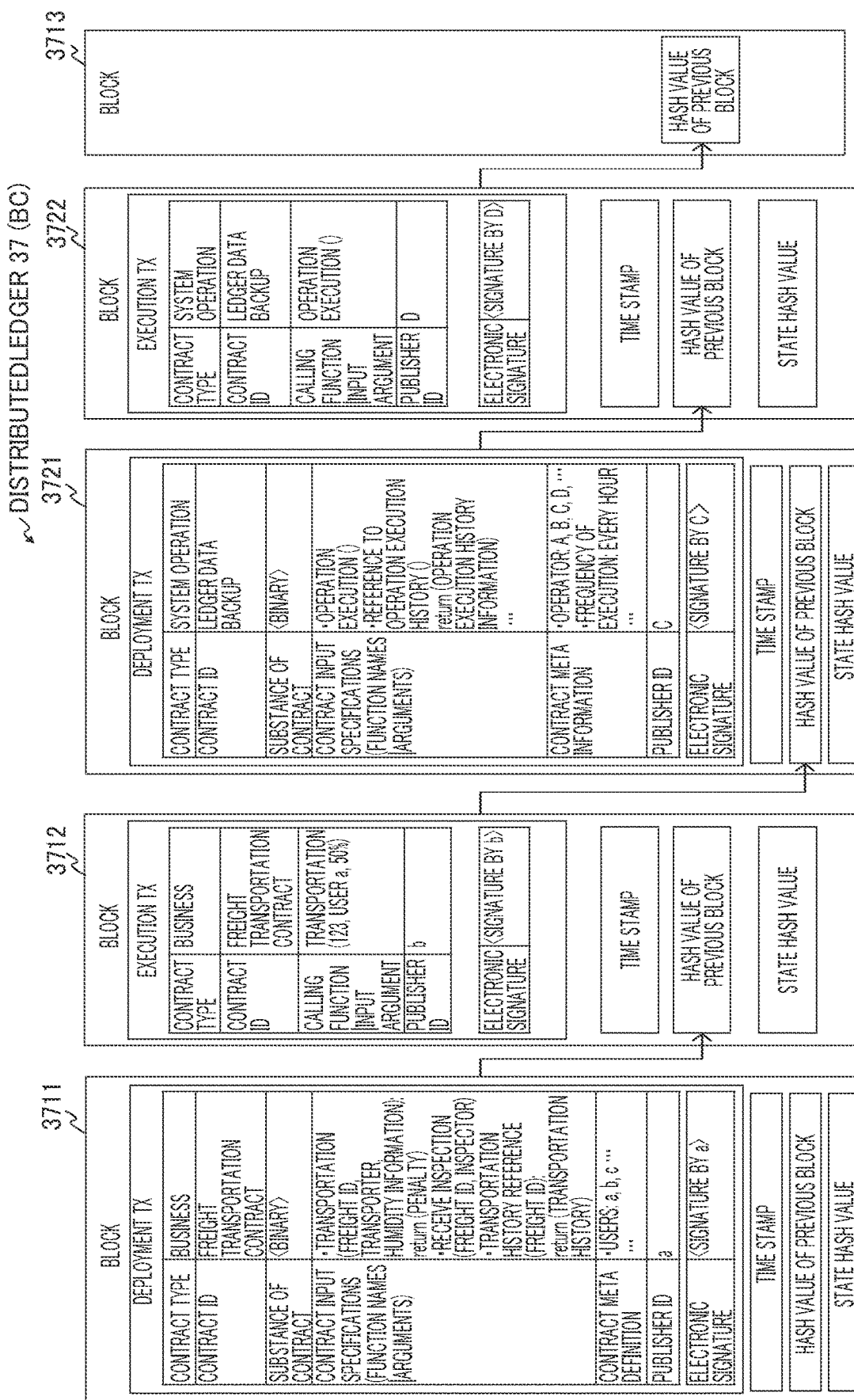
FIG. 4 is a diagram showing an example of a data structure of a block chain on a distributed ledger in the present embodiment.

Next, a configuration example of the distributed ledger 37 will be described. FIG. 4 and FIG. 5 are diagrams showing an example of a data structure stored in the distributed ledger 37. FIG. 4 is a diagram showing an example of BC which is one of data structures managed in the distributed ledger 37.

In the distributed ledger management using BC, a plurality of TXs are grouped as a block, and each block has a hash value of a preceding block, thereby managing data as a chain. In such a configuration, if the value of the block at the preceding stage changes even with 1 bit, the hash value of all succeeding blocks changes, so it is possible to make falsification difficult. In this embodiment, one block is provided for each TX in order to simplify the explanation. However, the present invention is also applicable to a case where a plurality of TXs are collectively stored in one block.

Blocks 3712 to 3721, blocks 3721 to 3722, and block 3713 in FIG. 4 are series of blocks, that is, BC.

Each block includes one of TX information of deployment and execution of the operation SC, deployment and execution of the system operation SC, respectively. And each block contains time stamp information related to generation of the block. Furthermore, each block includes a hash value of the previous block and includes a hash value generated from state information to be described later.

With the data structure as described above, the TXs of the deployment and execution of the operation SC, the deployment of the system operation SC are managed as a chain of data in the BC.

Among the blocks constituting the BC, the block 3711 is an example of a block storing the deployment TX of the business SC 371. In this example, an example of a business contract concerning freight transportation is shown.

The deployment TX of this embodiment includes a contract type for specifying whether a contract is a business or a system operation, a contract ID for uniquely identifying a contract, and a substance (for example, executable binary) of a contract. It also includes contract input specifications for users to grasp function names and arguments of contracts.

The deployment TX also includes a contract meta-definition which is a parameter (for example, contract user and various definition information) defined according to input arguments specified at the time of deployment. The deployment TX also contains ID information for identifying the publisher of this deployment TX, that is, the provider. The deployment TX also includes an electronic signature used to verify that the issuer and the data have not been tampered with. This electronic signature is generated using the secret key of each network participating member (that is, SC provider or user) issued by the member management unit 33, and it is possible to verify with the public key serving as the pair.

A block 3712 is an example of a block storing the execution TX of the business SC 371. The execution TX of this embodiment includes the contract ID of the contract to be called, the function name of the contract to be called and the information of the input argument.

Furthermore, the execution TX contains ID information for identifying the issuer of this production executing TX, that is, the user. The execution TX also includes the user signature used to verify that the issuer and the data are not falsified. Note that not only the issuer but also the information on the network participants involved in consensus formation may be managed/retained.

Block 3721 and block 3722 are examples of blocks storing the deployment TX and execution TX of the system operation SC 372. The deployment TX and the execution TX of the system operation SC 372 of the present embodiment include the same information as the same TX of the business SC 371 as a data structure in general. It is assumed that there is only a difference as to whether SC related to business is described simply, or SC concerning system operation is described. This makes it possible to implement the present invention as an outside function without changing the inside of the distributed ledger system 6 (specifically, the functions of 31 to 35 of the distributed ledger node 3). In the following, the functions that the SC possesses are also referred to as SC functions.

FIG. 5 is a diagram showing state information managed in the distributed ledger 37 of this embodiment. In the distributed ledger management using BC, normally, in order to acquire the (latest) state (for example, in the case of the virtual currency, the balance of the account), the BC has to be traced. Since processing efficiency of this method is not good, there is a method of caching the latest state information separately from BC (Non-Patent Literature 3, etc.). Therefore, it is assumed that the latest state information is retained also in this embodiment.

In this embodiment, it is assumed that a data area for a state is prepared for each contract. The state information holds the contract ID and the actual state of the contract.

As a result, the SC execution/management unit 32 of the distributed ledger node 3 can acquire and execute the actual condition of the contract with the contract ID as a key. The state information has an internal table for holding the execution result of the SC. Every time the TX is executed, the contents of this internal table are updated. Regarding this state information, SC information of both the business SC 371 and the system operation SC 372 is stored.

Figure 6:
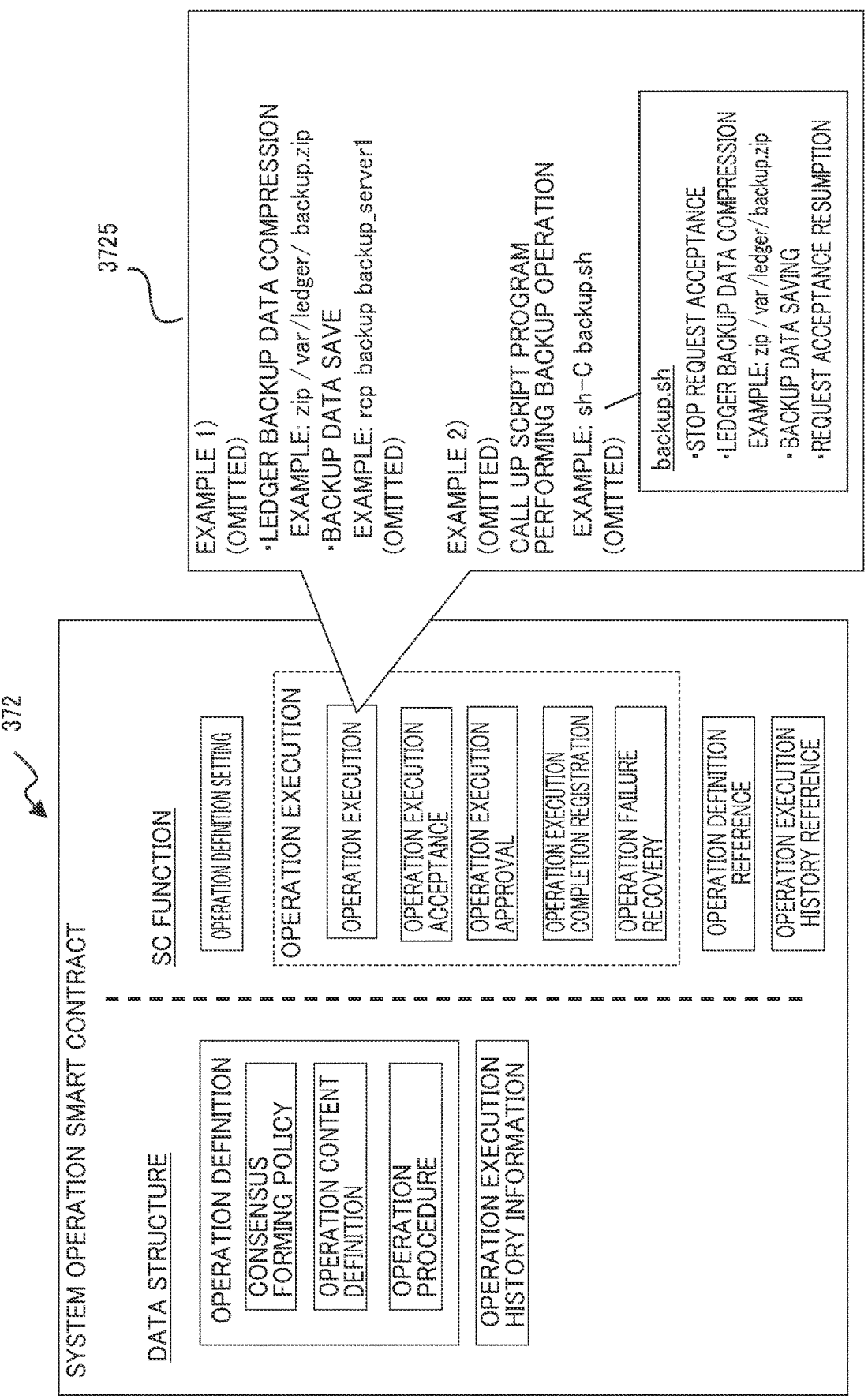
FIG. 6 is a diagram showing an example of definition of a data structure and a function of a system operation SC in the present embodiment.

Next, a specific example of the system operation SC 372 in this embodiment will be described. FIG. 6 is a diagram showing an example of the data structure and the SC function of the system operation SC 372.

The data structure in the system operation SC 372 is managed and held as state information. In the data structure in the system operation SC 372, "consensus forming policy", "operation content definition", and "operation procedure" are described as policies relating to system operation.

"Consensus forming policy" is information for managing on which node consensus is formed and which node executes the system operation SC 372 corresponding to each operation work. Here, the consensus forming policy is assumed to be managed as internal information of the system operation SC 372. However, the consensus forming policy may be managed outside the system operation SC 372. (The management method of the same also depends on the implementation of the base.)

"Operation content definition" is information indicating the outline of the operation work. The "operation procedure" defines/manages the operation process and the individual operation handling (invocation of the operation commands, management API, etc.) performed in this operation work. It is desirable that the operation procedure is described in the source code base (for example, a list of operation commands). By using the source code base, it is possible to perform the operation work uniformly. "Operation execution history information" is an execution history of operation works defined in the system operation SC.

As the SC function, it is assumed that "operation definition setting", "operation definition reference", "operation execution history reference", and "operation execution" are defined. These SC functions are specified and executed at the time of issue of the execution TX to the system operation SC 372.

"Operation definition setting" is an SC function that changes the definition of the operation work defined in this SC. Basically, the definition of the operation work is assumed to be set at the time of deployment (at the time of deployment TX issuance). However, if it is necessary to change the operation policy, it is also possible to update the definition by using this SC function.

"Operation definition reference" and "operation execution history reference" are SC functions for acquiring/referring to the operation definition defined in the system operation SC 372 and the information on the execution history thereof.

"Operation execution" is an SC function that executes the operation work defined in the system operation SC 372. The operation procedure executed during the operation work is assumed to be described mainly in the data structure "operation procedure". However, the operation procedure may be described as a code in the SC function of the "operation work". In either case, it is possible to commonalize operational works on a code base.

Here, "operation execution" is not limited to a simple operation execution, but it is possible to consider several variations depending on the pattern of operation work. For example, the "operation execution" process may be divided into "operation execution acceptance" for accepting processing and "operation execution completion registration" for registering completion of accepted operation execution.

In addition, recovery processing to be executed when the operation execution fails midway may be defined in the SC function (for example, "operation failure recovery"). Furthermore, when it is desired to provide an explicit approval process by the administrator/management organization before the operation is performed, the SC function "operation execution approval" may be prepared. In Embodiment 1, a case where the operation execution processing is simply performed is described, and variations of these are described in Embodiment 2 and the following.

The example of the system operation SC 372 shown in FIG. 6 assumes not a specific system operation work but a description assuming a common model of system operation work. Actually, concrete operational work such as "backup operation" or the like is applied according to this model.

As a specific method of application of the operation work (method of defining the system operation SC), the system operation SC may be defined for each specific operation work or a common system operation SC may be prepared and information on a specific operation work may be defined by inputting parameters such as argument for deployment. In addition, a single operation task may be managed in one system operation SC (in that case, for example, different types of operation work are managed for each contract ID), or two or more types of operation work may be managed (in that case, for example, different types of operation tasks are managed for each definition ID in FIG. 5).

Here, examples of system operation work include backup/restoration work of distributed ledger data, service halt work related to the distributed ledger system, system log acquisition work from each node for failure analysis and auditing, increase/decrease of node/resource and SC update work requiring explicit approval process, system emergency countermeasure work (security measures, troubleshooting measures), and the like. Among such various kinds of operation work, in the following embodiments, the backup operation work of the ledger data managed by the distributed ledger node 3 will be explained as a specific example as necessary.

Note that a balloon 3725 on the right side of FIG. 6 shows a concrete image of the operation procedure taking the backup operation of the ledger data as an example. In the SC function "operation execution" or in the data structure "operation procedure", as shown in "Example 1)" in the balloon 3725 the command string of the operation work may be enumerated, or as shown in "Example 2)" an operation execution program 36 (for example, an external program describing an operation execution command string) to be called and a related setting file may be shown.

Next, a flow example of the operation management method in Embodiment 1 will be described. In Embodiment 1, an example of simply executing the operation work defined in the system operation SC 372 is shown as a basic form of the operation management method.

Figure 7:
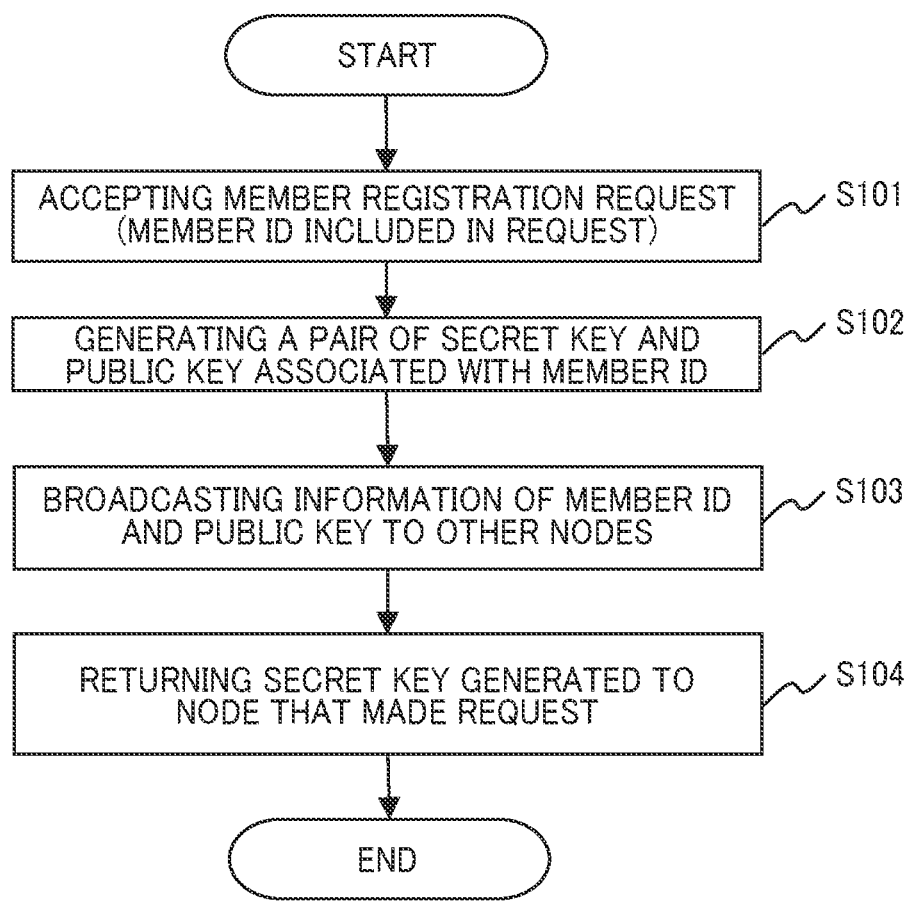
FIG. 7 is a flowchart showing an example of a new member registration process of a business network according to the present embodiment.

FIG. 7 is a flowchart showing an example of a registration process of new members participating in a business network. In this case, the member management unit of the distributed ledger node 3 accepts a member registration request from another node such as the client node 4 (S101). In this member registration request, a member ID uniquely identifying the requesting member is included.

Subsequently, the member management unit 33 generates a pair of a secret key and a public key by an appropriate algorithm, and associates this combination with the member ID received in S101 (S102).

Next, the member management unit 33 broadcasts the member ID to be new registration obtained in S101 and the public key generated in S102 to other nodes (S103). Information of the member ID and the public key broadcasted here is stored as participating member management information 38 on each node.

Further, the member management unit 33 returns the secret key generated in S102 to the node that made the member registration request (the node as a trigger of S101) (S104). On the other hand, the node that received this secret key stores the same in the participating member management information 38 as its own secret key.

In this embodiment, it is assumed that authentication of a network participating member, signature to TX, control of SC execution authority, and the like are performed using a pair of a secret key and a public key generated as described above.

Specifically, for example, the client node 4 side issues a TX digitally signed with the issued secret key, and the verification node verifies the digital signature using the public key, thereby realizing identity verification.

Note that a publicly known or well-known technique may be applied to a method of generating a pair of a public key and a private key, a method of signature verification, and a method of linking keys and IDs, so they are not described in detail herein. In the present embodiment, the function of the member management unit 33 is shown as a function in the distributed ledger node 3. However, a node dedicated to member management may be set outside and the node may provide the same function as the member management unit 33.

Figure 8:
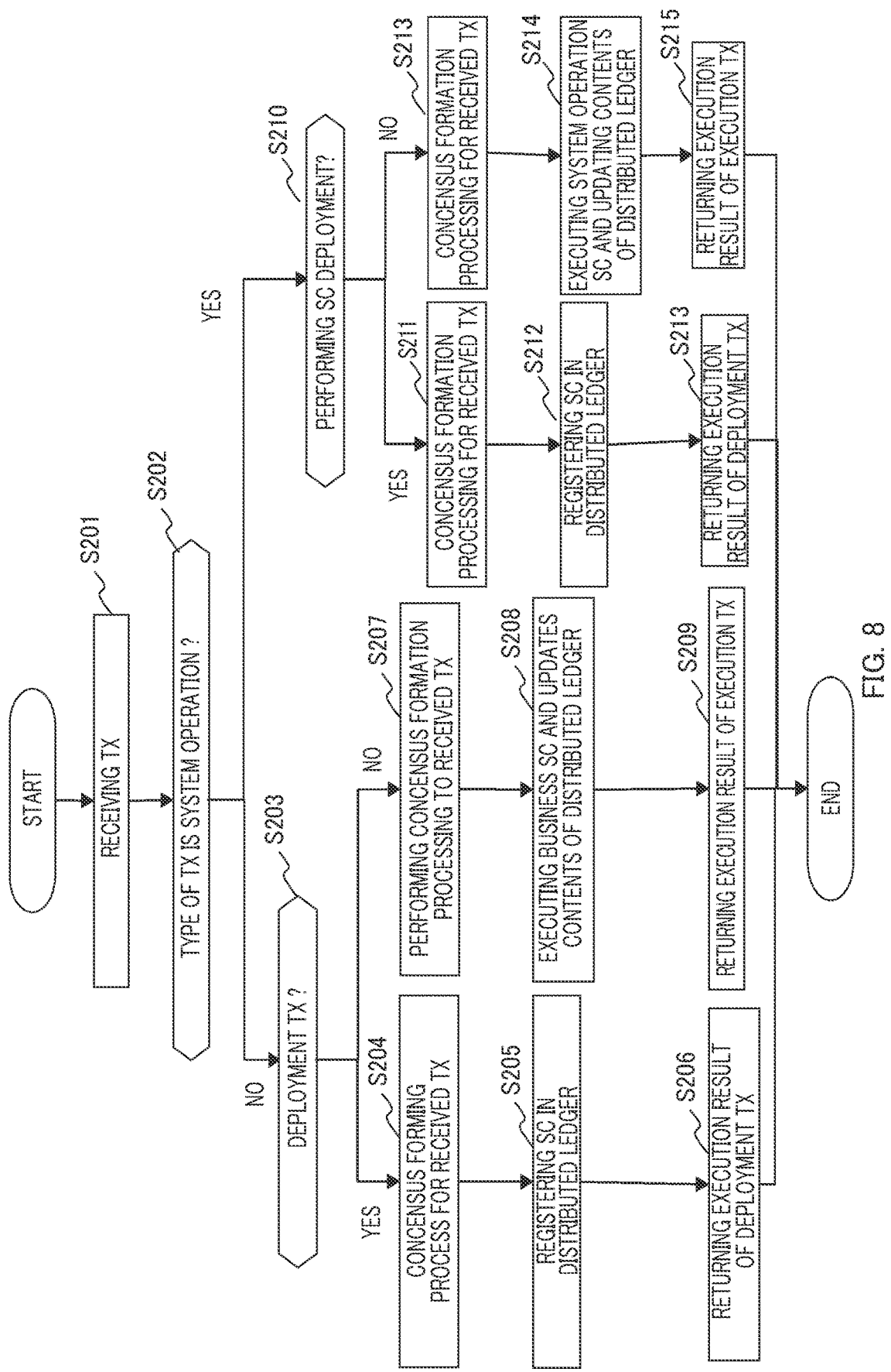
FIG. 8 is a flowchart showing an example of transaction processing of a business SC and a system operation SC in the present embodiment.

Subsequently, the TX execution process will be described. FIG. 8 is a flowchart showing an example of TX execution processing, that is, the processing of deployment and execution of the business SC, deployment and execution of the system operation SC.

In this case, the transaction management unit 34 of the distributed ledger node 3 receives the TX from the TX issuer such as the client node 4 (S201), and transfers the TX to the consensus management unit 31, thereby deployment and execution of the business SC 371, and deployment and execution of the system operation SC 372 are made according to the type of SC/TX.

When the TX received from the transaction management unit 34 is the deployment TX of the business SC 371 (S202: NO, S203: YES), the consensus management unit 31 performs a consensus forming process with the other distributed ledger nodes 3 on whether the received TX may be executed and whether the received TX may be added as a block to the end of BC (S204).

More specifically, known or well-known techniques may be employed as a consensus forming processing method. Specifically, it is conceivable to adopt, for example, an algorithm called Practical Byzantine Fault Tolerance (PBFT). PBFT is an algorithm in which consensus may be formed if consensus made among nodes more than or equal to a constant ratio (two-thirds or more) between all nodes participating in consensus forming (i.e., verification nodes).

Briefly explaining the consensus formation based on the PBFT as described above, the distributed ledger node 3 broadcasts the received TX to all the distributed ledger nodes 3 participating in the network. On the other hand, each distributed ledger node 3 verifies the signature on the TX, confirms that no tampering has been done, and verifies the validity of the content of the TX, and broadcasts the confirmation result to another distributed ledger node 3.

When confirmation can be made by a certain number or more of the distributed ledger nodes 3, the distributed ledger node 3 broadcasts to the other distributed ledger nodes 3 that preparation for approval of TX has been completed. Then, consensus formation is completed with confirmation of completion of approval preparation by more than a certain number of distributed ledger nodes 3.

When the consensus formation is completed in this way, the consensus management unit 31 registers the SC included in the TX in the distributed ledger 37 (S205) via the SC execution/management unit 32. Specifically, based on the contents of TX, the contract ID and an entity of the contract are registered as the state information in the distributed ledger 37, and the block including this deployment TX is added to the end of the BC.

Finally, the consensus management unit 31 returns the execution result of the deployment TX to the TX issuer (S206).

On the other hand, in the case where the TX received from the transaction management unit 34 is the execution TX of the business SC 371 (S202: NO, S203: NO), the consensus management unit 31 performs consensus formation processing (S207) similarly to the deployment TX. This consensus forming process is the same as S204.

Upon completion of this consensus formation, the consensus management unit 31 executes the SC and updates the contents of the distributed ledger 37 via the SC execution/management unit 32 (S208).

Specifically, the consensus management unit 31 executes the SC with the contract ID designated in the execution TX, the SC assumed to be already registered, by giving the calling function and the input argument specified in the execution TX to the SC. Based on the result, the contents of the distributed ledger 37 are updated. Further, the consensus management unit 31 updates the state information 502 relating to the contract at issue based on the execution result, and adds the execution TX as a block at the end of the BC.

Finally, the consensus management unit 31 returns the execution result (for example, the return value of the function) of this execution TX to the TX issuer (S209).

On the other hand, when the TX received from the transaction management unit 34 is the TX of the system operation SC 372 (S202: YES), the consensus management unit 31 performs SC deployment or execution processing (S210 to S215) as in the case of the business SC 371.

However, in this case, difference is that the operation procedure specified in the system operation SC 372 is executed instead of that specified in the business SC (S214). The operation work itself is performed by the function of the operation execution program 36.

Figure 9:
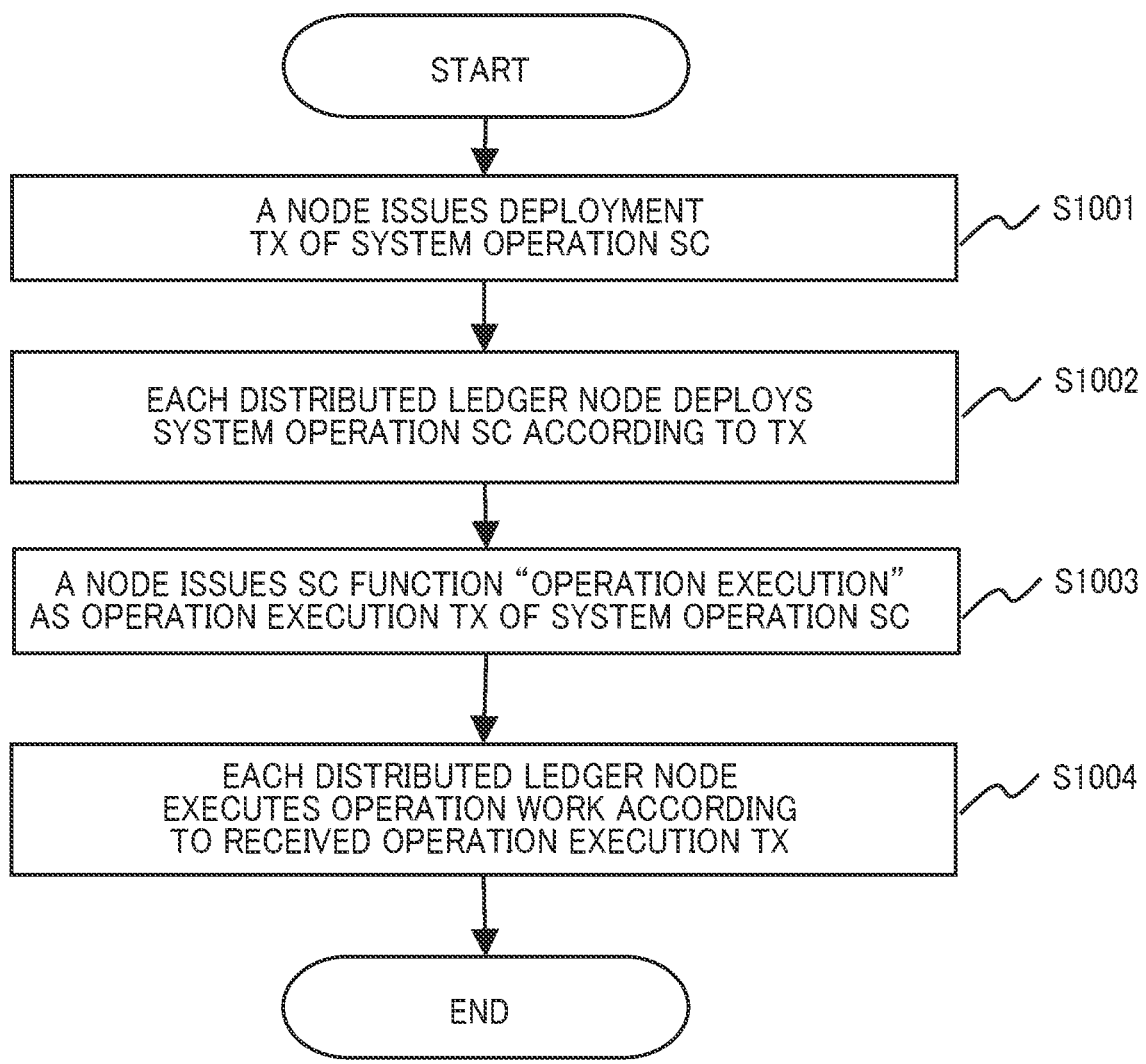
FIG. 9 is a flowchart showing a flow of an operation work execution according to a system operation SC as the entire operation management system in Embodiment 1.

Here, the flow of the operation work execution according to the system operation SC 372 as the whole system in Embodiment 1 will be described with reference to FIG. 9.

In this case, when a node issues a deployment TX of the system operation SC 372 (S1001), each distributed ledger node 3 receives the TX, forms consensus among the nodes, and deploys the system operation SC 372 according to the TX (S1002).

After the system operation SC 372 is deployed, when a call of the SC function "operation execution" is issued from a node as an operation execution TX to the system operation SC 372 (S1003) at the timing of the operation work execution, each distributed ledger node 3 receives the TX, forms a consensus between the nodes, and executes the operation work according to the operation execution TX (S1004).

Here, as the timing of the operation work execution, the timing at which the operation execution TX is issued by an operation on the display screen of the system operation application 42 by any administrator who is authorized to perform the operation work defined in the SC, the timing at which the operation execution TX is issued by the direct operation of each node, or the timing at which the operation execution TX is automatically issued according to the scheduled regular execution timings.

Figure 10:
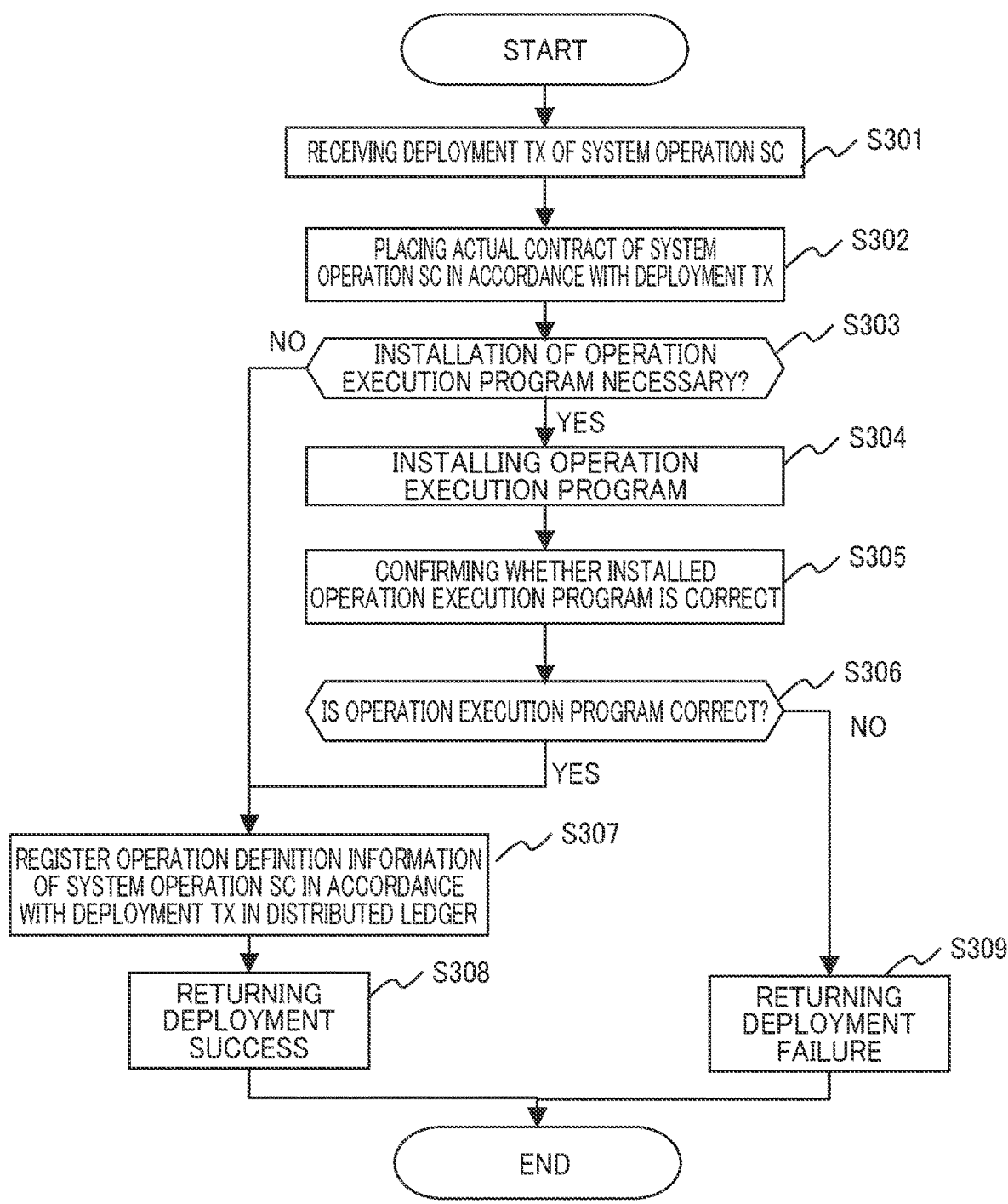
FIG. 10 is a flowchart showing an internal processing example of a deployment TX of a system operation SC in the present embodiment.

FIG. 10 is a flowchart showing an internal processing example of the deployment TX of the system operation SC 372. Each distributed ledger node 3 receives the deployment TX of the consensus formed system operation SC 372 (S301), and performs the deployment processing of the system operation SC 372 by the function of the SC execution/management unit 32.

Specifically, the distributed ledger node 3 first places the contract entity of the system operation SC 372 in accordance with the deployment TX (S302).

If this contract is managed externally and installation of the operation execution program 36 is unnecessary, that is, if the program has been introduced as standard on each distributed ledger node 3, or if the contract entity includes all the required operation processing (S303: NO), the distributed ledger node 3 registers the operation definition information of the system operation SC 372 to be deployed in the distributed ledger 37 according to the deployment TX (S307) and returns a successful deployment (S308).

On the other hand, if it is necessary to install the operation execution program 36 managed externally (S303: YES), the distributed ledger node 3 downloads the operation execution program 36 corresponding to the system operation SC 372 from the external repository or the like, and installs the program in a predetermined directory of the distributed ledger node 3 (S304). It should be noted that this installation may be executed in advance separately from the processing flow.

Next, the distributed ledger node 3 checks whether or not the operation execution program 36 is correct (S306). As this checking method, for example, a hash value is calculated from the binary of the operation execution program 36 installed in the distributed ledger node 3, and this hash value is compared with the internal variable in the system operation SC 372 separately calculated in advance in another environment, and determines if the hash value is correct based on whether or not the both values match. The hash value to be used for such determination may be a hash value calculated from the same binary in another distributed ledger node 3, not in a separate environment.

If it is determined that the operation execution program 36 is correct as a result of the above-described determination (S306: YES), the distributed ledger node 3 performs the subsequent normal system processes (S307 to S308), and if it is found to be incorrect (S306: NO), returns a deployment failure (S309).

By judging whether or not the operation execution program 36 is correct as described above, when the operation execution program 36 as externally provided is used, it is possible to prevent execution of an unexpected operation work due to occurrence of falsification of the program, a difference in the version or the setting, a failure in configuration or the like and to further enhance the uniformity of the operation work.

Figure 11:
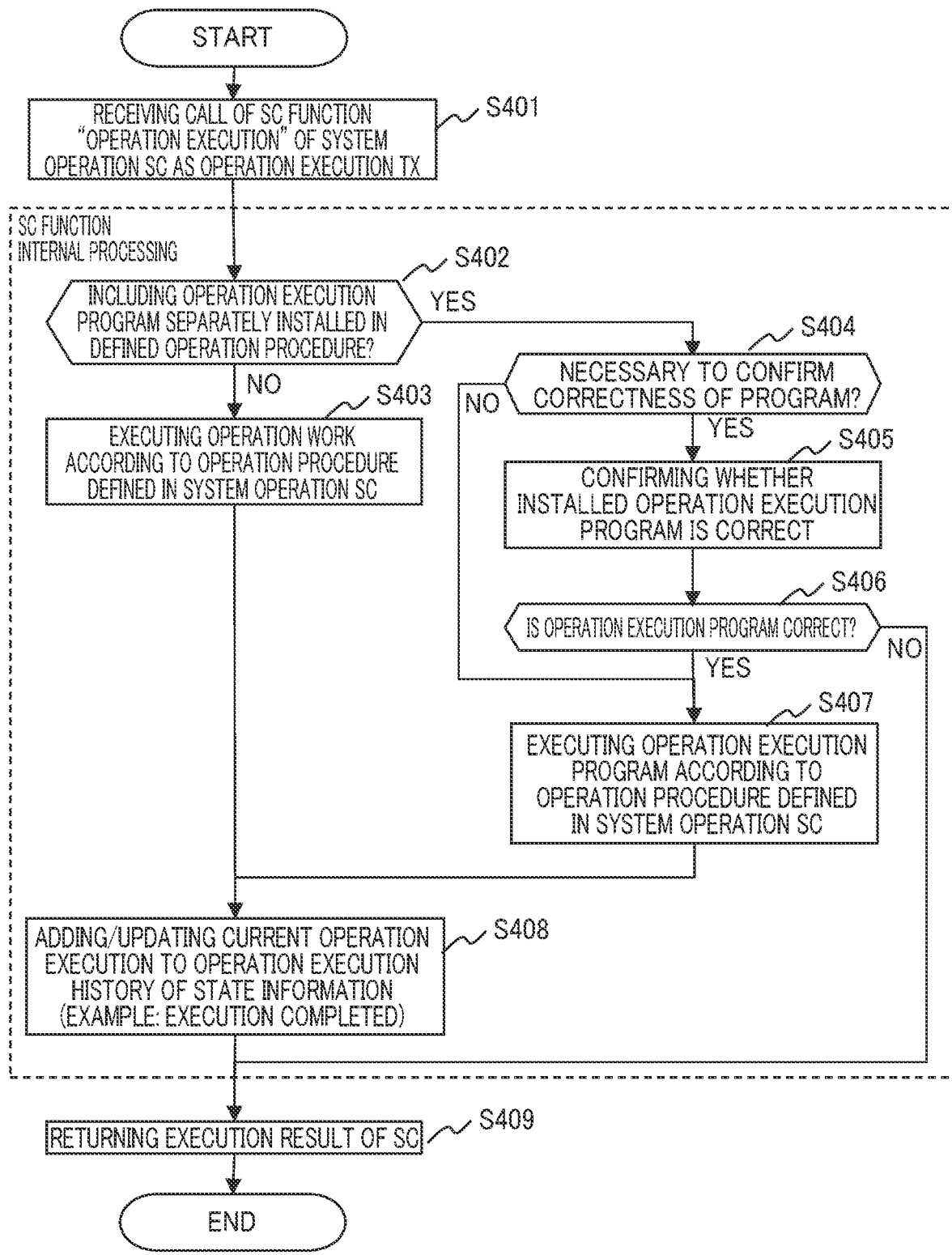
FIG. 11 is a flowchart showing an example of internal processing at the time of calling the SC function "operation execution" of the system operation SC in the present embodiment.

FIG. 11 is a flowchart showing an example of internal processing at the time of calling the SC function "operation execution" of the system operation SC 372.

When each distributed ledger node 3 receives the SC function "operation execution" call of the system operation SC 372 as the operation execution TX on which a consensus is formed (S401), each distributed ledger node 3 performs the system operation work according to the above TX with the function of the SC execution/management unit 32. The internal processing is specified below.

When the distributed ledger node 3 does not include the operation execution program 36 that is separately installed in the defined operation procedure in the system operation SC 372 to be executed (S402: NO), the distributed ledger node 3 performs the operation work according to the operation procedure defined in the system operation SC 372 (S403). In the case of the ledger data backup operation work, for example, the ledger backup data compression command and the backup data save command are sequentially executed according to a predefined procedure.

Also, after the execution of the operation work is completed, the SC execution/management unit 32 adds the current operation execution to the operation execution history of the state information to update the same in the distributed ledger 37 (S408). For example, as a record of the operation execution history, "operation completed" as the operation definition name, the execution start/end time, and the execution state are added.

Finally, the distributed ledger node 3 returns the execution result (e.g., success) of this system operation SC 372 (S409).

On the other hand, when the operation execution program 36 separately installed in the defined operation procedure is not included in the system operation SC 372 to be executed (S402: NO), the distributed ledger node 3 may perform the confirmation processing of the correctness of the operation execution program 36 for each execution.

When the correctness of the operation execution program 36 is necessary (S404: YES), the distributed ledger node 3 judges whether or not the installed operation execution program 36 is correct (S405) by the same method as in S306.

As a result of this determination, when the operation execution program 36 is correct (S406: YES) or if confirmation is not required (S404: NO), the distributed ledger node 3 performs the operation work by executing the operation execution program 36 according to the operation procedure defined in the system operation SC 372 (S407). In the case of the ledger data backup operation work, for example, a separately installed backup program or script is called up, and a series of backup processing including halt of request acceptance, ledger backup data compression, backup data saving, and request acceptance resumption.

After the execution of the operation work is completed, the SC execution/management unit 32 additionally adds the current operation execution to the operation execution history of the state information and updates the same in the distributed ledger 37 (S408), and returns the execution result of the system operation SC 372 (e.g., success) (S409).

As a result of the above-described determination, if the operation execution program 36 is determined incorrect (S406: NO), the distributed ledger node 3 does not execute the operation work, and returns the execution result of the system operation SC 372 (e.g. Failure due to incorrect program) (S409).

Figure 12:
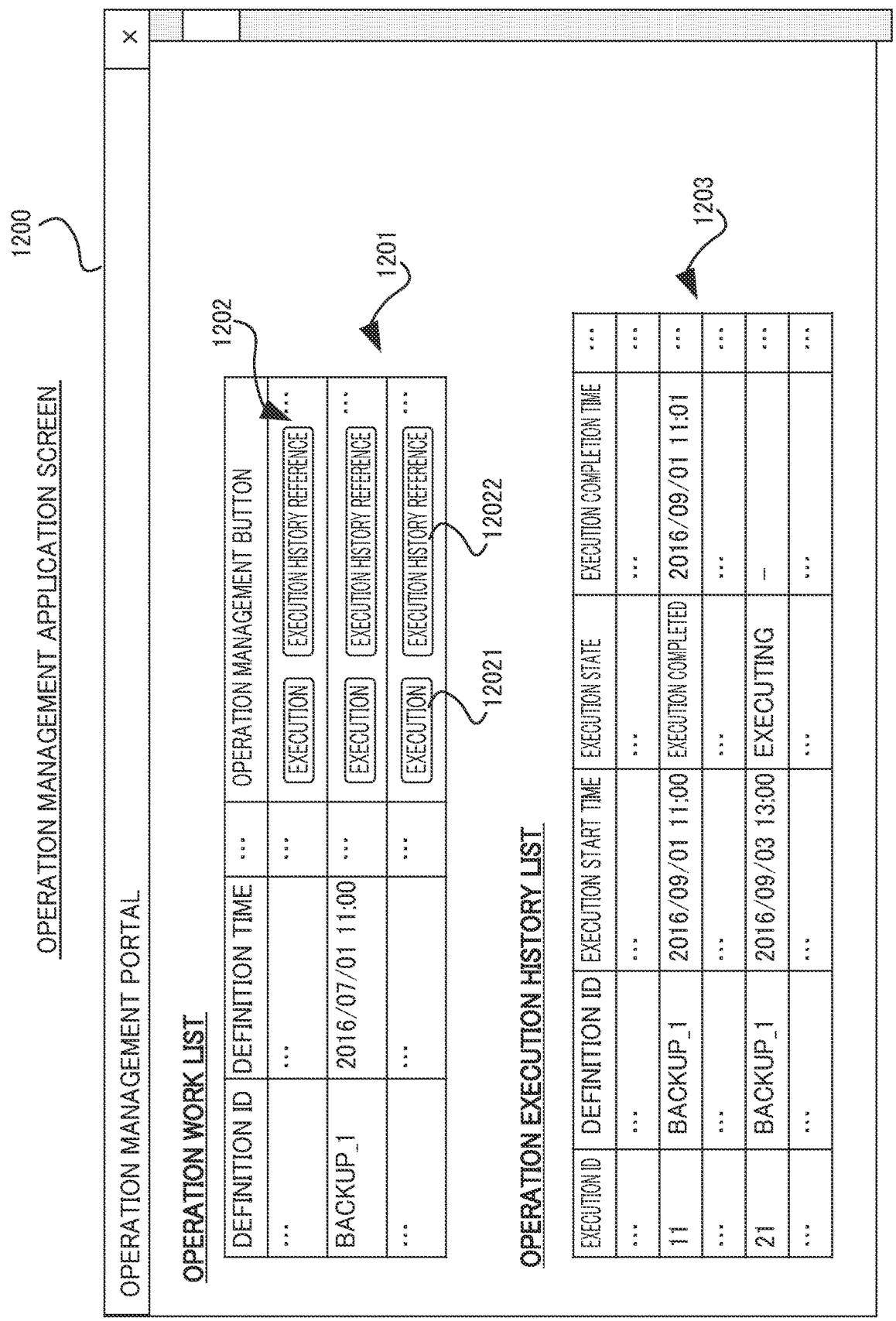
FIG. 12 is a diagram showing an example of a screen of an operation management application according to the present embodiment.

FIG. 12 shows an example of a screen displayed by the distributed ledger node 3 to the user when executing the operation management procedure as described above. FIG. 12 shows an example of the display screen 1200 of the operation management application 42.

On the upper part of the screen of the display screen 1200, an operation work list 1201 defined in the system operation SC 372 is arranged. The display information in this operation work list 1201 is acquired and arranged by the distributed ledger node 3 by executing the SC function "operation definition reference".

An operation management button 1202 is shown on the right side of the operation work list 1201. An administrator who is authorized to execute the operation work defined by the SC can issue the operation execution TX of the designated system operation SC 372 by pressing the execution button 12021 in the operation management button 1202 of the operation management application 42. By pressing the execution history reference button 12022, the operation execution history list 1203 of the specified system operation SC 372 as specified can be referred to.

The operation execution history list 1203 is arranged at the bottom of the display screen 1200. The display information in the operation execution history list 1203 can be acquired by the distributed ledger node 3 executing the SC function "operation execution history reference".

Even when a specific operation manager requests the system operation work via the operation management application 42, consensus is formed between the distributed ledger nodes 3 managed by a plurality of administrators in the back end, and the operation work is performed at the same timing in accordance with the same operation procedure in each distributed ledger node 3.

As described above, by using the operation management method of the present embodiment, even in the case where there are a plurality of administrators in the distributed ledger system, it is possible to form consensus on policies and execution timings and to perform the operation work collaboratively. In other words, it is possible to carry out the operation work while assuring the nature of non-centralization and a normal level.

In addition, the present embodiment can deal with the operation of distributed processing system constructed by multiple vendors. Furthermore, by embedding the operation procedure in the SC and making it procedural or scripted, it is possible to ensure uniformity of operation among multiple nodes (owned by multiple subjects).

In addition, as an auxiliary effect of utilizing the consensus forming algorithm of the distributed ledger system, it can be guaranteed that the executed operation work meet the normal standards of the distributed ledger system. For example, in PBFT, even when f nodes in (3f+1) nodes are malicious nodes, normal operation is possible). Therefore, even if the operation work fails or malicious operators exist, it is theoretically possible to maintain the normal operation level within the range guaranteed by the consensus algorithm of the distributed ledger system.

In this embodiment, an example using a PBFT is shown as a consensus forming algorithm, however, the present invention is not limited thereto. The present invention is also applicable to other algorithms. For example, Bitcoin's consensus forming algorithm, Proof of Work or its alternative algorithm, Proof of Stake may be used. Alternatively, the consensus forming algorithm of Hyperledger Fabric, Endorser-Orderer Model may be used. Further, in FIG. 8 of the present embodiment, the case where the TX execution processing is performed in the order of reception of a TX, identification/determination of the TX, consensus formation, execution processing of the SC based on the TX, and addition of blocks is shown as an example, however, the order of processing is not limited to this. For example, the order of TX identification/determination and consensus formation may be reversed.

Various variations of the embodiment of the present invention will be shown hereinafter. Basically, since it is based on Embodiment 1, the description of the common part will be omitted. Further, it is also possible to combine the embodiments for use.

Embodiment 2

In Embodiment 2, an example is shown in which the system operation work according to the system operation SC 372 is divided into the operation phase of the operation execution and the completion phase of the operation execution, and further, automatic recovery is also performed according to the SC when the operation work fails during the execution.

If this embodiment is employed, since there is no need to wait for the completion of the operation execution carried out in the system operation SC 372, even if it takes a long time for the operation work, another next execution TX can be executed earlier, and it is possible to reduce affection on the business SC 371 and other system operation SC 372. In addition, it is possible to manage that the operation work has been reliably performed and the processing is completed in all the nodes that should perform the operation work. Furthermore, it is possible to make the recovery process uniform by describing the process at the time of operation failure as an SC.

Figure 13:
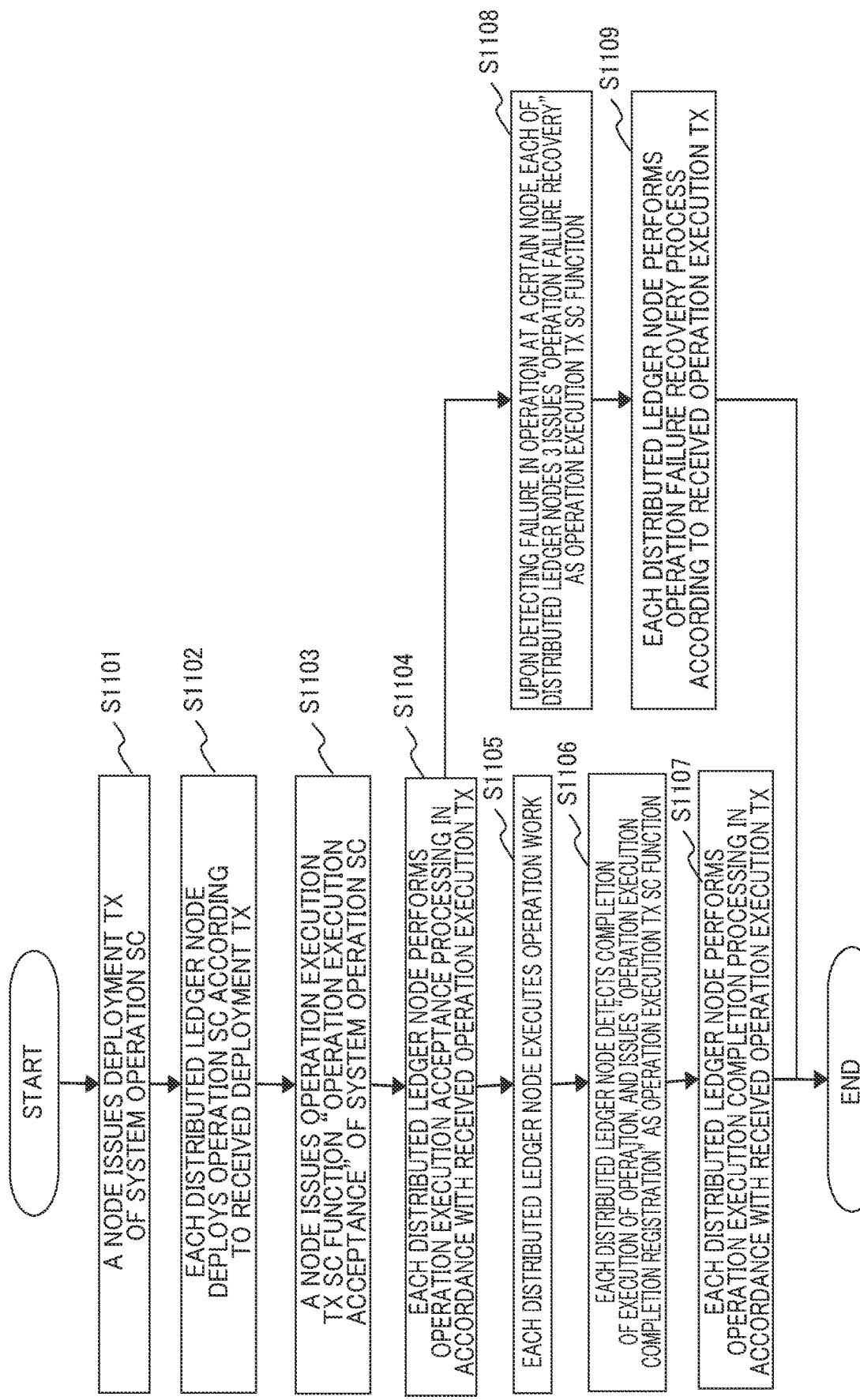
FIG. 13 is a flowchart showing a series of flows of operation execution reception, operation execution, execution completion registration, and recovery processing according to the system operation SC as the entire operation management system in Embodiment 2.

FIG. 13 is a flowchart showing a series of processes from acceptance of operation execution, work execution, execution completion registration, and recovery process according to the system operation SC 372 as a whole system in Embodiment 2.

In this case, when each distributed ledger node 3 receives a call of "operation execution acceptance" as the operation execution TX after the system operation SC 372 is deployed (S1101 to S1102), each distributed ledger node 3 only performs the operation execution acceptance processing in the SC, and then returns the completion of the system operation execution TX (S1103 to S1104).

Next, each distributed ledger node 3 executes the operation work in accordance with the system operation SC 372 triggered by the operation execution acceptance process (S1105).

Upon completion of execution of the operation work, each distributed ledger node 3 calls "operation execution completion registration" as an operation execution TX as a trigger (S1106).

Next, each distributed ledger node 3 performs operation execution completion processing according to the received operation execution TX (S1107). In the operation execution completion processing, when the operation execution completion status in each distributed ledger node 3 is registered/managed and a predetermined condition of completion of operation execution (for example, completion of execution in all the target nodes) is satisfied, the operation work as the entire system is determined to be completed.

In the system operation SC 372, each distributed ledger node 3 automatically executes a recovery process for a failure when the operation execution fails. Specifically, upon detecting a failure in operation at a certain node, each of the distributed ledger nodes 3 issues "operation failure recovery" as an operation execution TX by one of the nodes (S1108). Each distributed ledger node performs an operation failure recovery process according to the operation execution TX as received (S1109). Such an event that the operation execution is not completed when if the predetermined execution timeout period has passed in the system operation SC 372 may be deemed to be a failure, for example.

Figure 14:
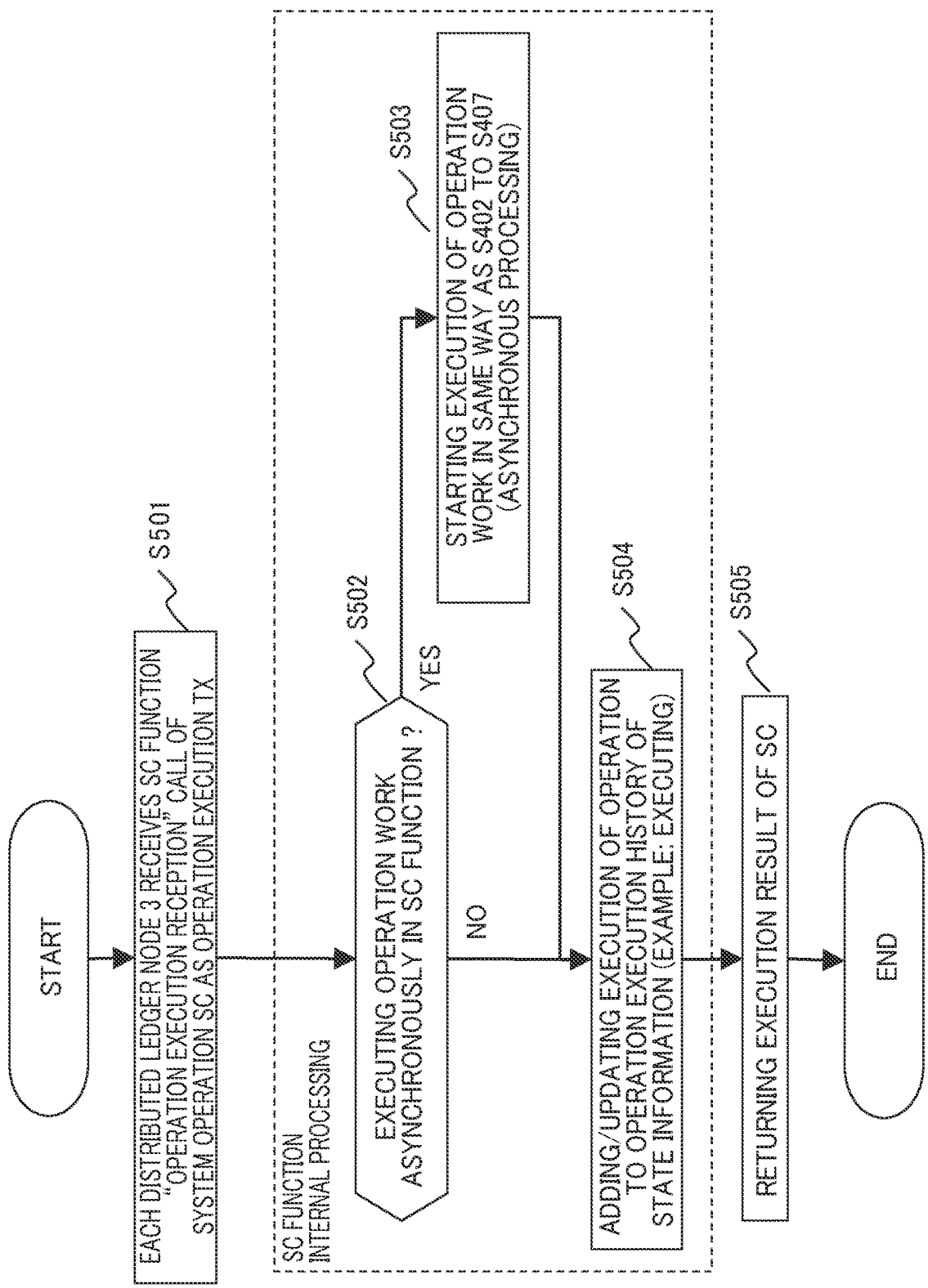
FIG. 14 is a flowchart showing an example of internal processing at the time of calling the SC function "operation execution reception" of the system operation SC in the present embodiment.

FIG. 14 is a flowchart showing an example of internal processing at the time of calling the SC function "operation execution acceptance" of the system operation SC 372 as the operation execution acceptance processing.

In this case, each distributed ledger node 3 receives the SC function "operation execution acceptance" call of the system operation SC 372 as the operation execution TX on which consensus is formed (S501), and according to the function of the SC execution/management unit 32, performs processing of acceptance of the system operation work execution according to the TX. The specific internal processing is shown below.

In the case of executing the operation work asynchronously in this SC function (S502: YES), the distributed ledger node 3 starts execution of the operation work (S402 to S407) in the same way as the SC function "operation execution" shown in Embodiment 1 (S503). However, unlike Embodiment 1, the nodes 3 perform the operation execution as an asynchronous processing, and within the SC, does not wait for completion of the operation work.

As a subsequent process of S503, or in the case where execution of the operation work is not started in this SC function (S502: NO), the SC execution/management unit 32 updates the operation execution history of the state information in the distributed ledger 37 (S504). For example, a record "execution in progress" is added to the operation execution history as the operation definition name, the execution start time, and the execution state.

Finally, the distributed ledger node 3 returns the execution result (e.g., success) of this system operation SC 372 (S505).

In the case where the operation work is not started in this SC function, for example, the operation execution program 36 functions as an agent, autonomously refers to the operation execution history autonomously and periodically, and, as triggered by addition of a new record "execution in progress", execution of the operation work according to this system operation SC 372 is started.

Figure 15:
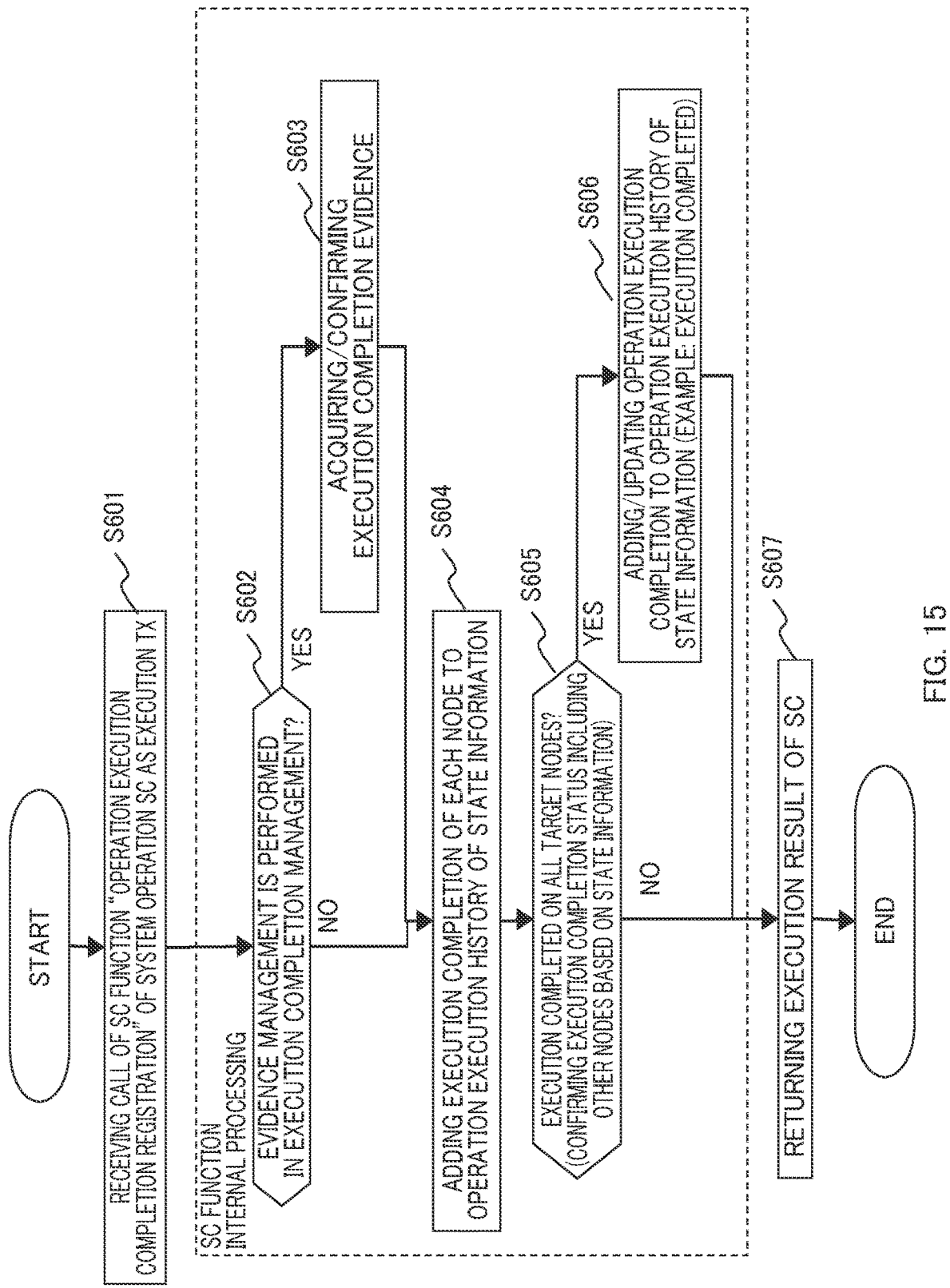
FIG. 15 is a flowchart showing an internal processing example at the time of calling the SC function "operation execution completion registration" of the system operation SC in the present embodiment.

FIG. 15 is a flowchart showing an internal processing example at the time of calling the SC function "operation execution completion registration" of the system operation SC 372 as the processing at the time of completion of operation execution.

In this case, each distributed ledger node 3 receives the SC function "operation execution completion registration" call of the system operation SC 372 as the operation execution TX on which consensus is formed (S601), and according to the function of the SC execution/management unit 32, performs execution completion registration processing at each node concerning the system operation work according to the TX. Specific internal processing is shown below.

Here, in managing execution completion, for explicit management of the completion of the operation work in each distributed ledger node 3, an execution log, an execution result (e.g., backup file information), and/or a screen snapshot, etc. indicating execution completion, and/or hash values thereof and the like may be registered/managed as evidence.

In the case where the evidence management is performed in the execution completion management (S602: YES), the distributed ledger node 3 acquires/confirms the execution completion evidence (S603). As a method of obtaining this evidence, the evidence may be included in the input argument of the SC function, or the evidence may be arranged inside the SC function after being arranged at a place where it can be referred from the SC function and retrieved in the SC function.

In the case where evidence management is not performed (S602: NO) or in a subsequent process of S603, the distributed ledger node 3 adds the fact that the execution of the operation work at the distributed ledger node 3 that issued the operation execution TX has been completed to the operation execution history of the state information (S604).

For example, a pair of a node name and a completion time is managed as an execution completion status at each node in a column of records indicating this operation execution, and the information is updated.

Further, the distributed ledger node 3 confirms the execution completion status including the other nodes based on the state information, and confirms whether execution on all the target nodes is completed (S605). If the execution is completed (S605: YES), this operation execution completion is added to the operation execution history of the state information to update the same. More specifically, for example, the execution state of the record indicating this operation execution is changed from "execution in progress" to "execution completed", and the execution completion time is registered.

Finally, the distributed ledger node 3 returns the execution result of this SC (S607).

Figure 16:
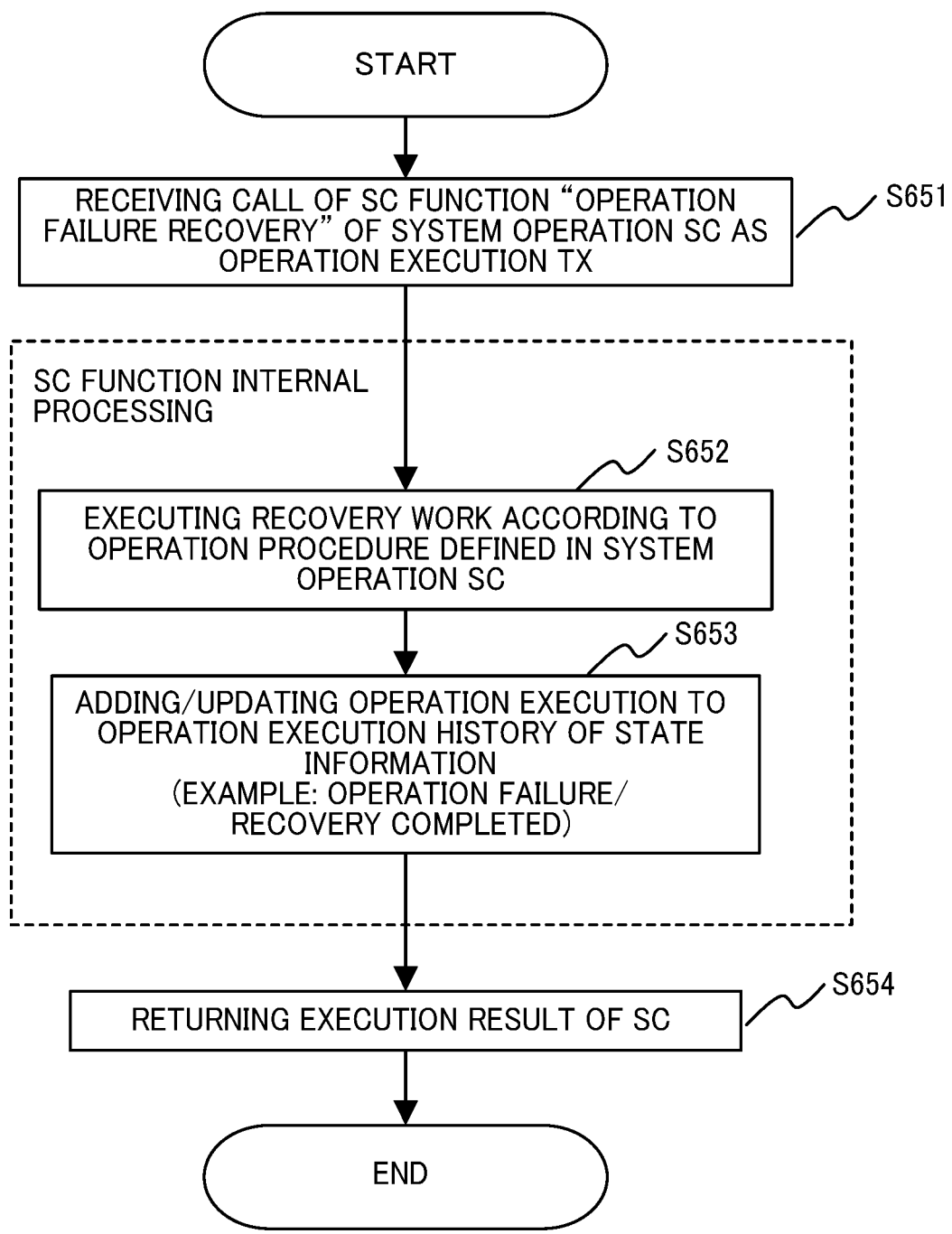
FIG. 16 is a flowchart showing an example of internal processing at the time of calling the SC function "operation failure recovery" of the system operation SC in the present embodiment.

FIG. 16 is a flowchart showing an example of internal processing at the time of calling the SC function "operation failure recovery" of the system operation SC 372.

In this case, each distributed ledger node 3 receives the SC function "operation failure recovery" call of the system operation SC 372 as the operation execution TX on which consensus is formed (S651), and, according to the function of the SC execution/management unit 32, performs recovery processing at the time of failure in operation. Specific internal processing is shown below.

First, the SC execution/management unit 32 executes the recovery work according to the operation procedure defined in the system operation SC 372 according to the received operation execution TX (S652). As an example of the recovery processing in the case of the ledger data backup operation, as the rollback processing, the intermediate data of the backup failure is deleted and the backup processing is executed again.

Next, the distributed ledger node 3 adds the operation execution to the operation execution history of the state information to update the same (S653). More specifically, the execution state of the record indicating this operation execution is changed from "execution in progress" to "operation failure/recovery completed", and the execution completion time is registered.

Finally, the distributed ledger node 3 returns the execution result of this SC (S654).

The recovery processing of the present embodiment is triggered by the calling of "operation failure recovery" of the SC function from the outside. However, it is possible to manage a trigger such as timeout in the SC to execute the recovery processing as the processing in the SC function.

In addition, although acceptance control of TX is not performed in the execution completion waiting state, acceptance of the same TX may be blocked when waiting for completion of execution. As a result, it is possible to suppress load increase due to concentrated execution and/or redundant execution of the operation execution TX.

The management of the evidence information in this embodiment is not essential and may be omitted. It is possible to manage the evidence information in the other embodiments including Embodiment 1.

Embodiment 3

In Embodiment 3, an example in the case where the system operation execution according to the system operation SC 372 includes an explicit approval process before each execution is shown. This approval means approval processing as a higher-level concept (business operation or system operation level) than consensus formation processing (protocol level) as to whether a TX is to be accepted or not. For example, it is effective when preliminary preparation is needed prior to execution of the operation work at each node.

Figure 17:
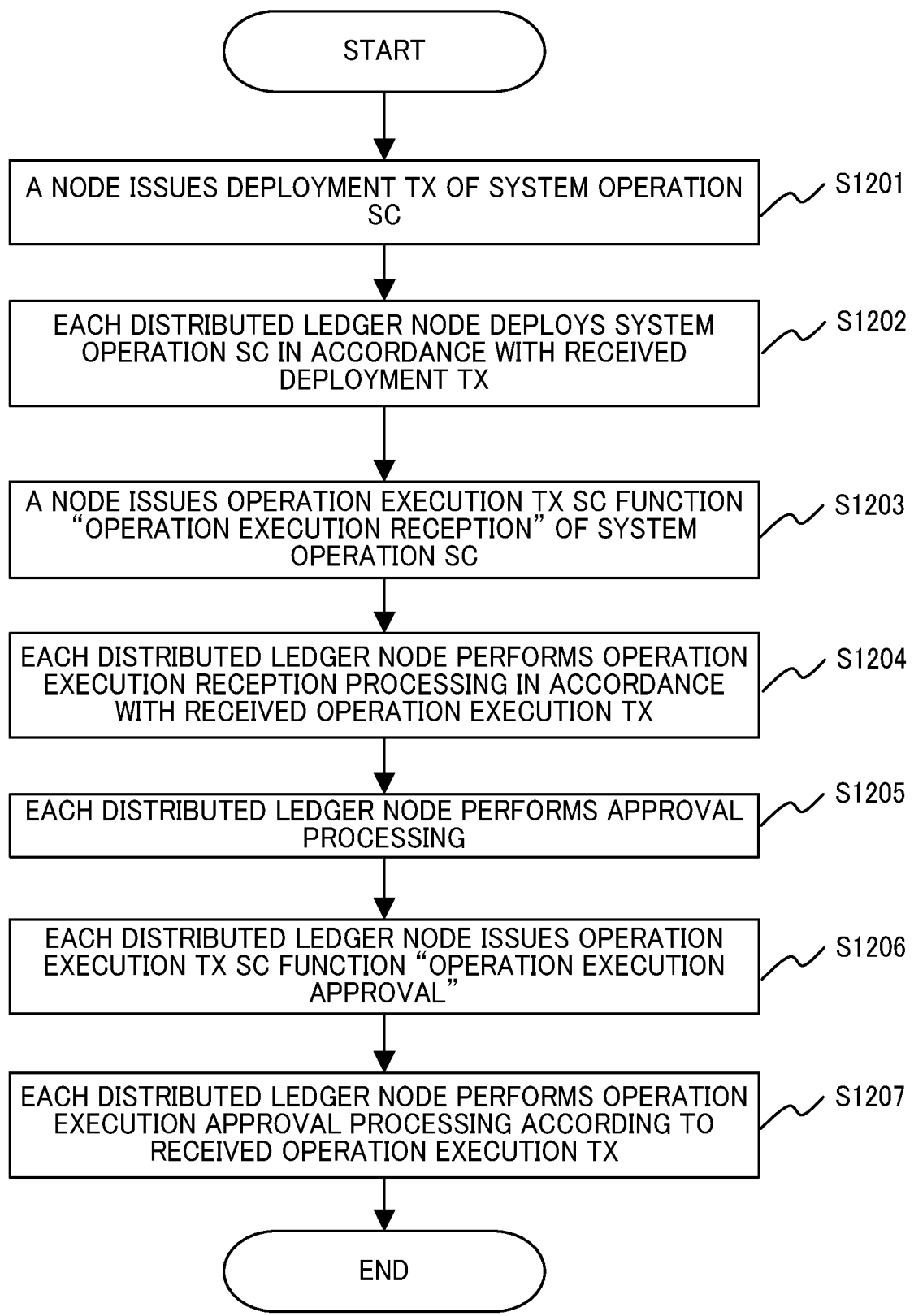
FIG. 17 is a flowchart showing a series of flows of operation execution reception, approval, and operation execution processing according to the system operation SC as the entire operation management system in Embodiment 3.

FIG. 17 is a flowchart showing a series of processes of operation execution acceptance, approval and work execution according to the system operation SC 372 of the whole system in Embodiment 3.

In this case, after the system operation SC 372 is deployed (S1201 to S1202), each distributed ledger node 3 receives a call of "operation execution acceptance" as the operation execution TX, performs only the operation execution acceptance processing on the SC, and returns the completion of the system operation execution TX (S1203 to S1204).

Next, each distributed ledger node 3 performs approval processing as to whether or not the administrative work can be executed according to the present system operation SC 372, triggered by the aforementioned operation execution acceptance process (S1205). This approval process may be automatically executed or may be manual determination.

Upon completion of the above approval, each distributed ledger node 3 calls "operation execution approval" as the operation execution TX as triggered by the completion (S1206).

Next, each distributed ledger node 3 performs operation execution approval processing according to the received operation execution TX (S1207). In the operation execution approval processing, an operation execution approval completion status of each distributed ledger node 3 is registered/managed and, when a predetermined condition for completion of operation execution approval (for example, completion of approval at all target nodes) is satisfied, the operation work in accordance with the system operation SC 372 is executed in the same manner as Embodiment 1 and 2.

In this embodiment, an example of issuing an approval TX (call of SC function "operation execution approval") is issued for each distributed ledger node 3. However, not for each node, the approval TX may be prepared for each organization or each administrator participating in a business network.

Figure 18:
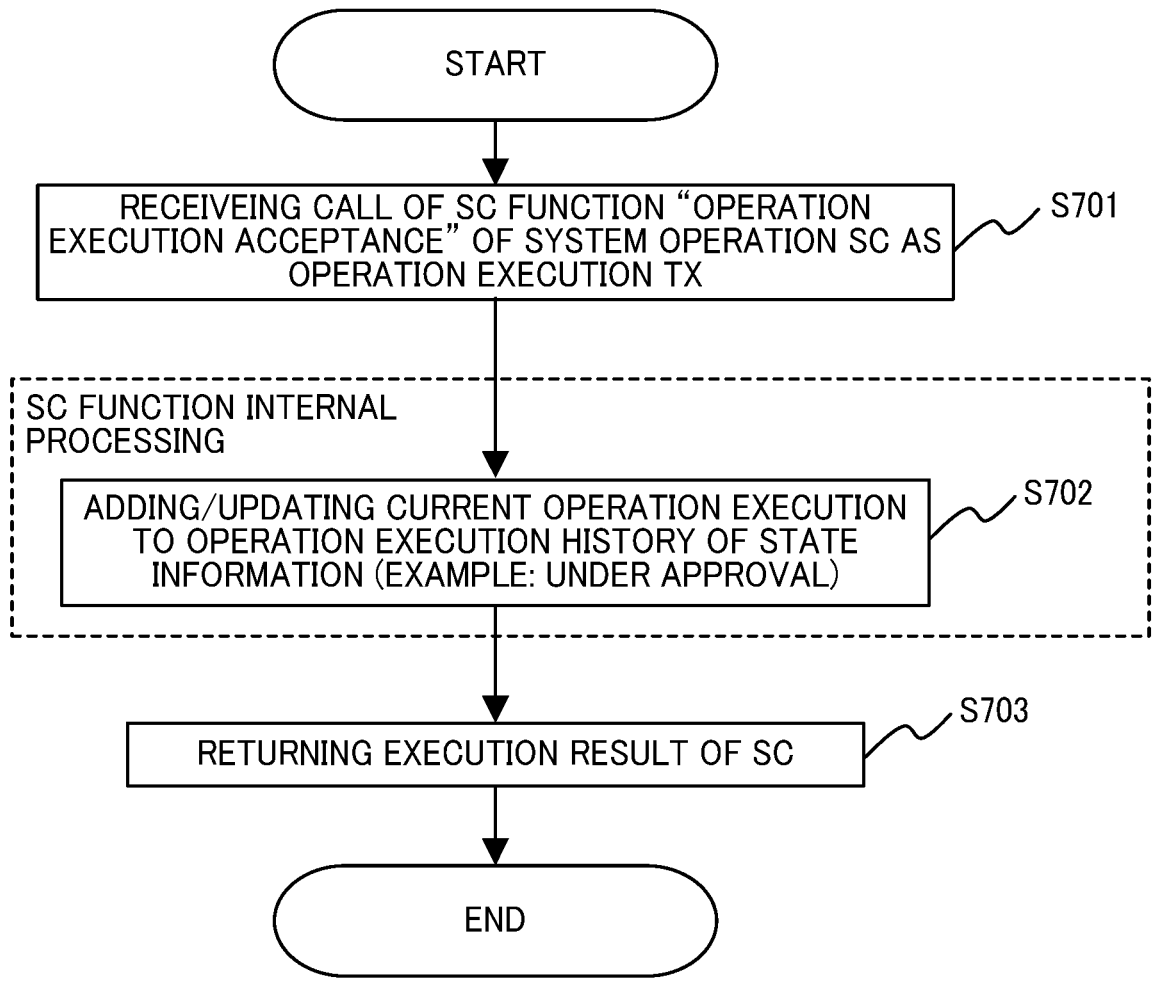
FIG. 18 is a flowchart showing an internal processing example at the time of calling the SC function "operation execution reception" of the system operation SC as the operation execution acceptance processing in Embodiment 3.

FIG. 18 is a flowchart showing an internal processing example at the time of calling the SC function "operation execution acceptance" of the system operation SC 372 as the operation execution acceptance processing in this embodiment.

In this case, each distributed ledger node 3 receives the SC function "operation execution acceptance" call of the system operation SC 372 as the operation execution TX on which consensus is formed (S701), and according to the function of the SC execution/management unit 32, executes acceptance processing of the system operation work execution. Specific internal processing is shown below.

First, the SC execution/management unit 32 adds the current operation execution acceptance to the operation execution history of the state information in the distributed ledger 37 to update the same (S702). For example, a record of an operation definition name, an execution start time, and an execution state of "approval in progress" is added to the operation execution history.

Finally, the distributed ledger node 3 returns the execution result (e.g., success) of this system operation SC 372 (S703).

Figure 19:
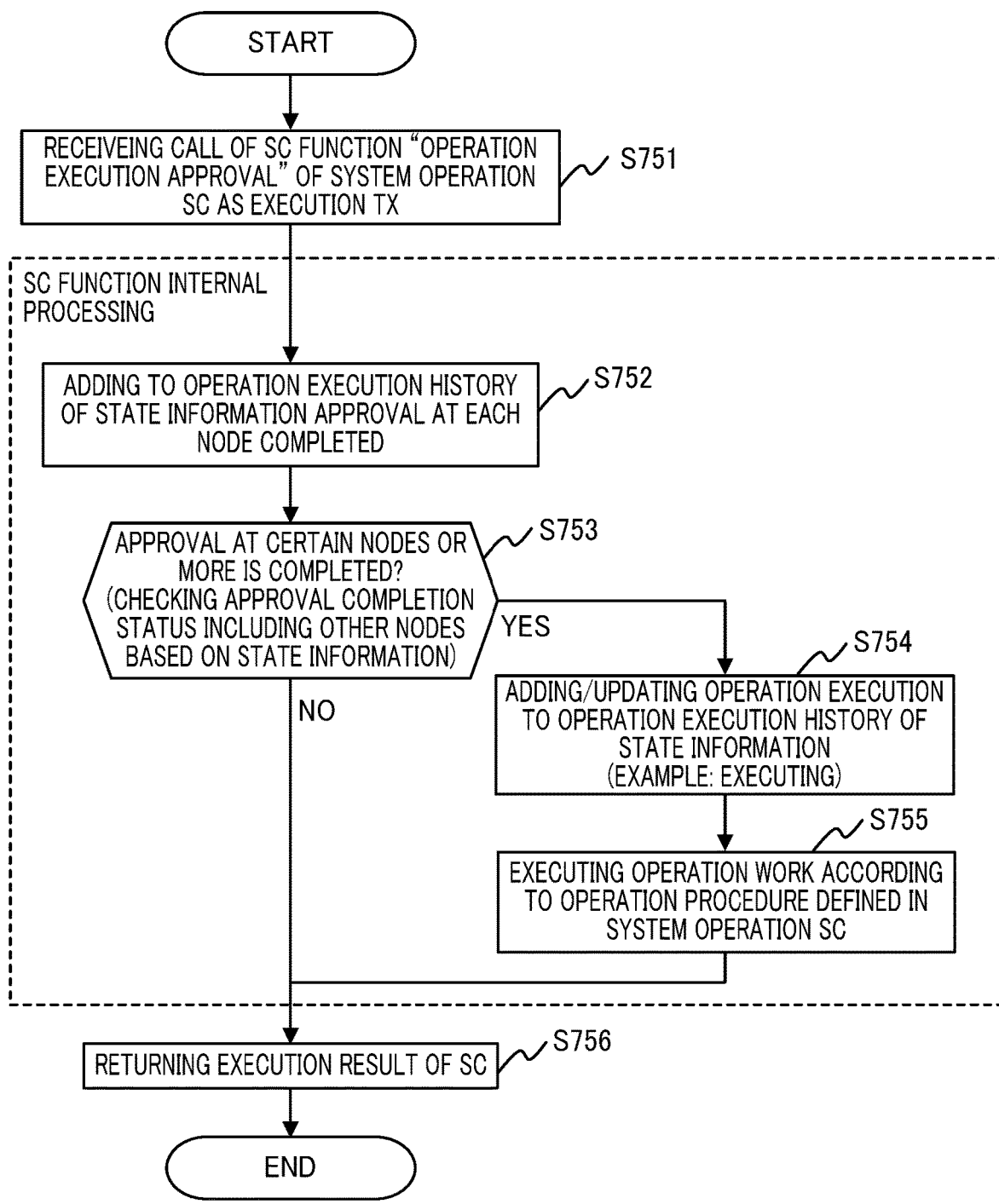
FIG. 19 is a flowchart showing an example of internal processing at the time of calling the SC function "operation execution approval" of the system operation SC in the present embodiment.

FIG. 19 is a flowchart showing an internal processing example at the time of calling the SC function "operation execution approval" of the system operation SC 372 as processing at the time of approval of operation execution.

In this case, each distributed ledger node 3 receives the SC function "operation execution approval" call of the system operation SC 372 as the operation execution TX on which consensus is formed (S751), and, according to the function of the SC execution/management unit 32, executes execution approval processing at each node concerning system operation work execution according to the TX. Specific internal processing is shown below.

First, the SC execution/management unit 32 adds to the operation execution history of the state information the fact that the approval of the operation execution at the distributed ledger node 3 that issued the operation execution TX has been completed (S752). For example, a pair of a node name and an approval completion time is managed as an approval completion status at each node in a column of records indicating this operation execution, and the information is updated.

Further, the distributed ledger node 3 checks the approval management completion status including those of the other nodes based on the state information, and confirms whether approval at all the target nodes is completed (S753). As a result, when it is determined that the approval is completed (S753: YES), the distributed ledger node 3 adds the approval completion of this operation execution to the operation execution history of the state information to update the same (S754). Specifically, for example, the execution state of the record indicating this operation execution is changed from "approval in progress" to "execution in progress".

When approval is completed as described above, the distributed ledger node 3 executes the operation work according to the operation procedure defined in the system operation SC 372 as in Embodiments 1 and 2 (S755), and returns the execution result of this SC (S756).

Incidentally, there are operational works such as those executed in accordance with a predetermined schedule or activation condition rather than those executed on-demand in the system operation work. The schedule/execution condition may be, for example, a specific date and time, a specific system state (when the amount of data has reached the upper limit), and the like. As a pattern for periodically executing the operation work, Embodiment 4 depicts an example in which the operation management node 5 prepared externally manages the periodic execution and Embodiment 5 depicts an example in which the periodic execution is managed in each distributed ledger node 3, more specifically executed by the operation execution program.

Embodiment 4

Figure 20:
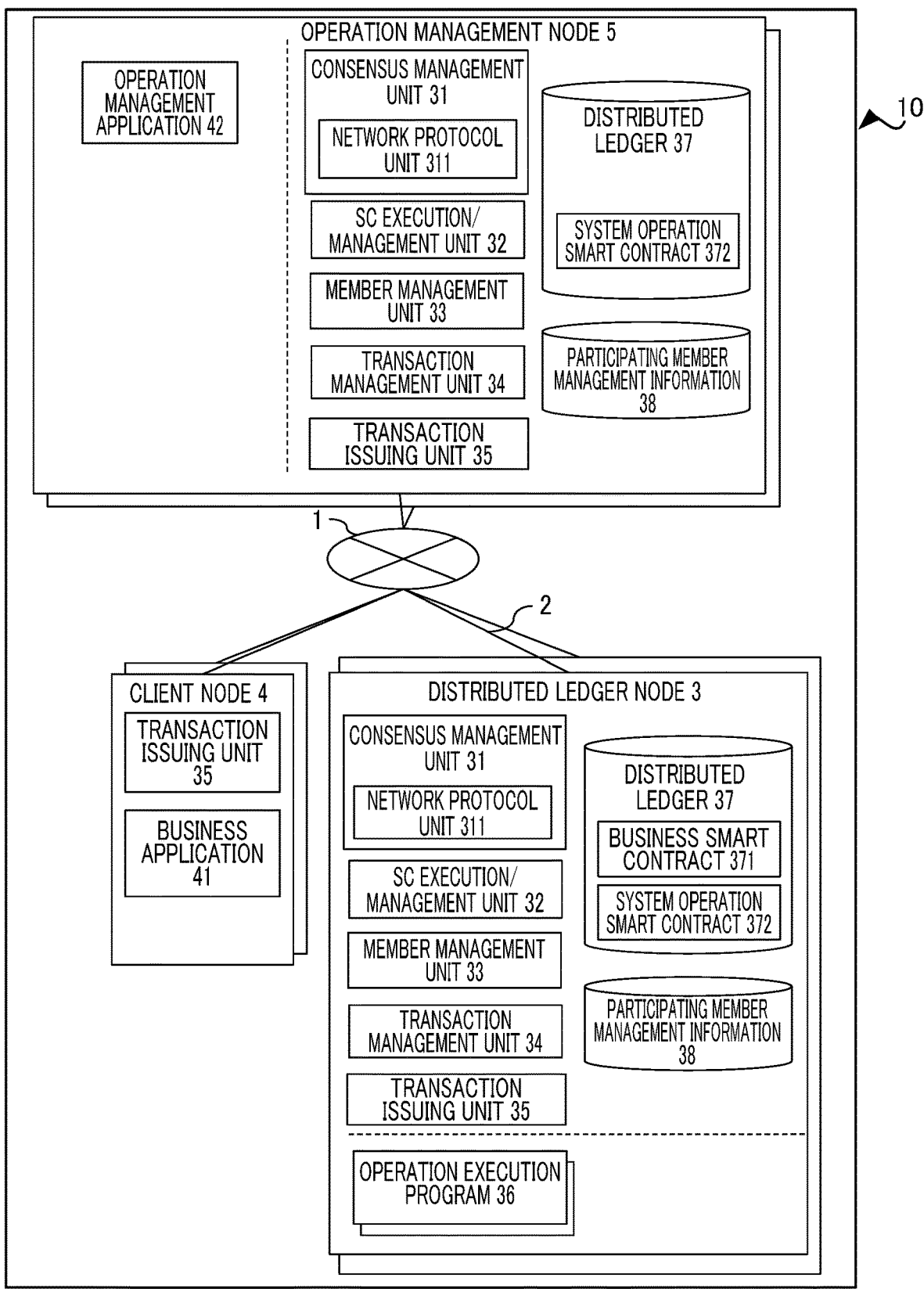
FIG. 20 is a diagram schematically showing an operation management system according to Embodiment 4.

FIG. 20 is a diagram schematically showing the operation management system 10 according to Embodiment 4. Unlike the operation management system according to Embodiment 1, the operation management node 5 is added, and the operation management application 42 is omitted from the client node 4. The rest other than the above is the same.

The operation management node 5 is a node for implementing operation management, and in this embodiment, it is assumed that in the same position as the distributed ledger node 3, the operation management node 5 participates in the network and participate sin consensus formation processing of the system operation SC 372. Therefore, the operation management node 5 has the same function as the distributed ledger node 3.

It should be noted that the operation management node 5 participates only in the processing of the system operation SC 372 and does not participate in the processing of the business SC. Therefore, in the distributed ledger 37 on the operation management node 5, only the information on the system operation SC 372 is held/managed. In addition, the operation management node 5 includes an operation management application 42. The function of the application 42 is the same as in Embodiment 1.

A system configuration in which a node for operation management participates in the network as described above is effective when a plurality of vendors do not participate in the work but only participate in the system operation work. A vendor which does not participates in the business can also implement multivendor operation in a non-centralized manner in order to carry out the operation work while forming consensus with the organization that performs the work.

Figure 21:
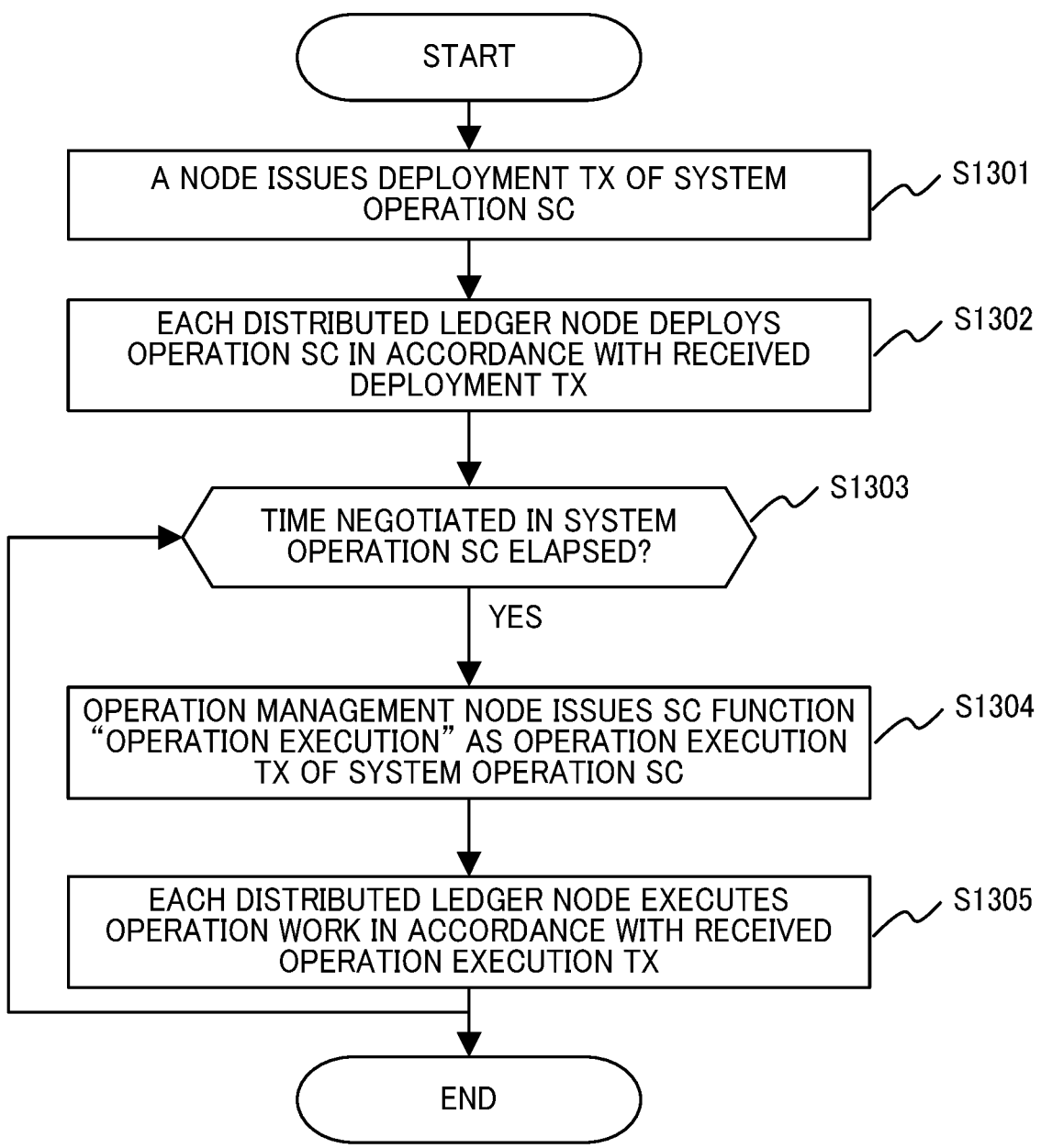
FIG. 21 is a flowchart showing an example of periodic execution processing of operation work in Embodiment 4.

FIG. 21 is a flowchart showing an example of periodical execution processing of the operation work in Embodiment 4. As a premise here, it is assumed that the system operation SC 372 for periodical execution is deployed to each node (S1301 to S1302).

Subsequently, when the time negotiated for the periodical execution elapses in the system operation SC 372 (S1303), the operation management node 5 issues the SC function "operation execution" as the operation execution TX of the system operation SC 372 (S1304). Here, the information on the frequency of periodical execution is specified, for example, by an input argument for deployment, and is held as state information in the SC.

For the operation execution TX issued by the operation management node 5, a consensus formation process is executed between the distributed ledger node 3 and the operation management node 5 participating in consensus formation.

After this consensus formation process, each distributed ledger node 3 executes the operation work according to the received operation execution TX (S1305).

After that, the operation management node 5 waits for a scheduled execution timing to repeatedly execute the operation work (S1303 to 1305).

Although, in this embodiment, the operation management node 5 participates in the consensus formation processing in the same position as the distributed ledger node 3, the operation management node 5 may issue the operation execution TX as the network participant, without the consensus formation. In that case, the functions 31 to 34 and the like similar to those in the distributed ledger node 3 are unnecessary to the operation management node 5.

Embodiment 5

In Embodiment 5, an example in which periodic operation execution is managed in each distributed ledger node 3, more specifically, by the operation execution program 36 is shown. The operation management system 10 in this embodiment is the same as in Embodiment 1.

Figure 22:
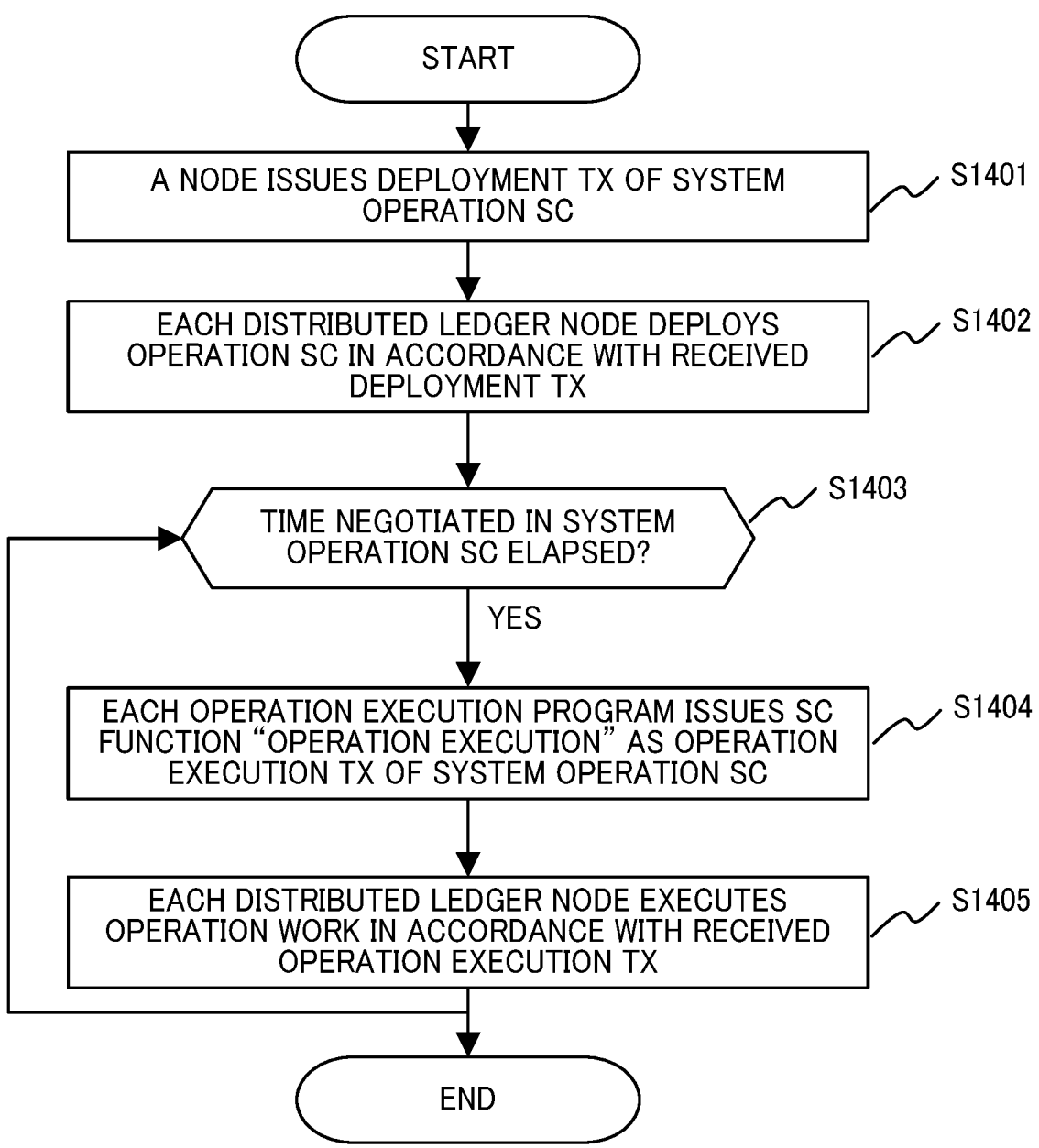
FIG. 22 is a flowchart showing an example of periodic execution processing of an operation work in Embodiment 5.

FIG. 22 is a flowchart showing an example of periodic execution processing of the operation work in Embodiment 5. As a premise here, it is assumed that the system operation SC 372 as periodically executed is deployed in each distributed ledger node 3 (S1401 to S1402). Therefore, the operation execution program 36 in each distributed ledger node 3 manages the periodical execution.

For example, the schedule of the periodic execution may be acquired from the state information in the SC, or information outside the SC, for example, one described in the setting information of the operation execution program 36 may be used.

In this case, when the time negotiated in the system operation SC 372 has elapsed (S1403: YES), the operation execution program 36 issues the SC function "operation execution" of the operation execution TX of the system operation SC 372 as a network participant (S1404).

In addition, each distributed ledger node 3 executes the operation work according to the received operation execution TX (S1405).

Here, in this embodiment, although the operation work is executed after the operation execution program 36 issues the SC function "operation execution", the execution result of the operation work may be registered via the SC function "operation execution completion".

Example 6

In Embodiment 3, an example of performing the approval process at the time of execution is shown. In addition, there is a case where it is desired to perform the approval process when registering a new system operation SC 372. Therefore, in Embodiment 6, an example in which a meta-contract for managing the system operation SC 372 is prepared and the approval processing in the registration of the new system operation SC 372 is performed will be described.

The meta-contract is an independent SC different from the system operation SC 372, and it is assumed that "operation definition registration acceptance" and "operation definition registration approval" are defined as the SC function. Since the basic SC deployment/execution processing and the management method on the distributed ledger are similar to those of the business SC 371 and the system operation SC 372, the description of the same is omitted.

Figure 23:
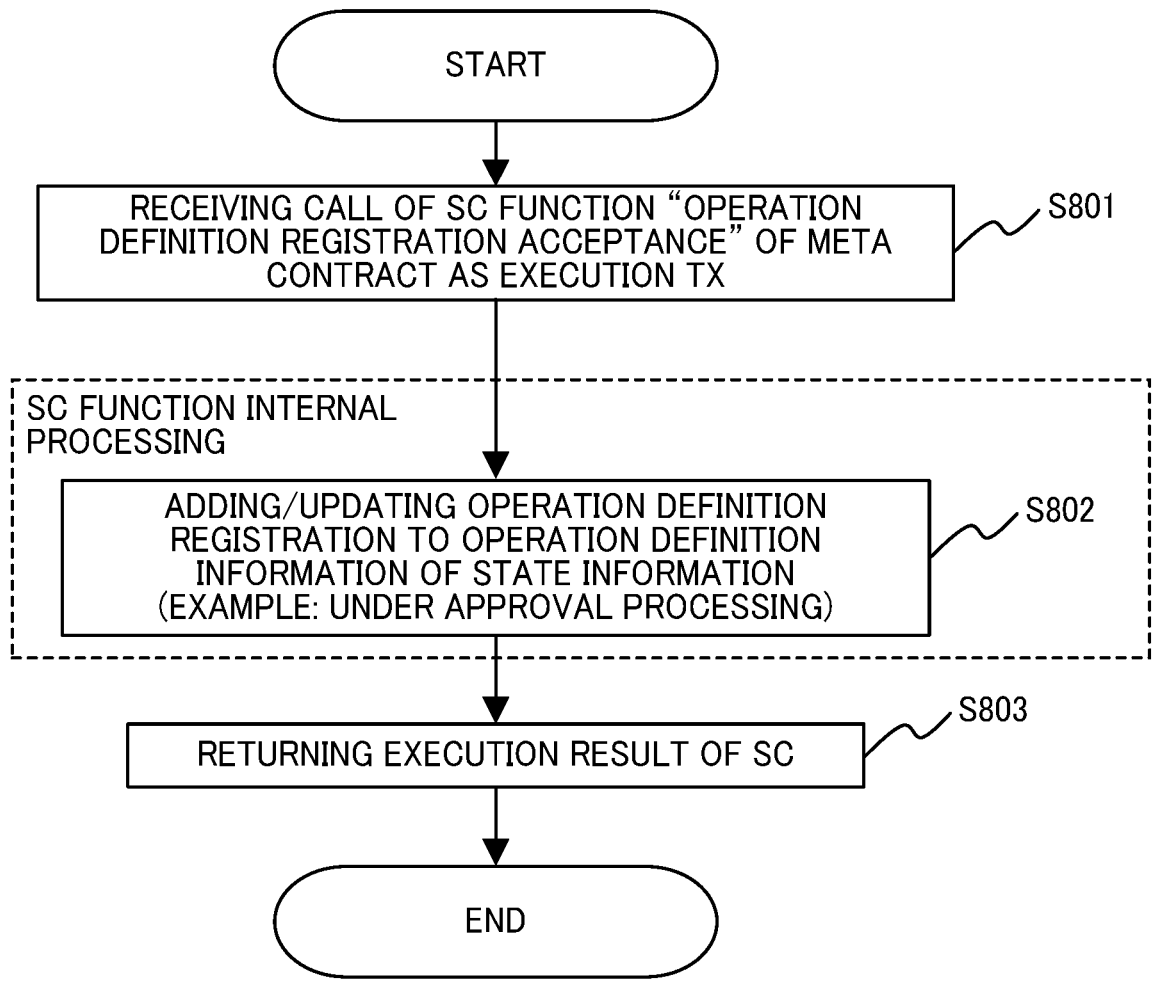
FIG. 23 is a diagram showing an example of a process of accepting new registration of a system operation SC in a meta-contract for system management SC management in Embodiment 6.

FIG. 23 shows an example of acceptance processing of registration of the new system operation SC 372 in the meta-contract that manages the system operation SC 372.

In this case, each distributed ledger node 3 receives the SC function "operation definition registration acceptance" call of the meta-contract as the execution TX on which consensus is formed (S801).

Next, each distributed ledger node 3 performs the acceptance process of the new system operation SC 372 according to this TX by the function of the SC execution/management unit 32. Specific internal processing is shown below.

The SC execution/management unit 32 adds the new acceptance of this time as the operation definition information of the state information in the distributed ledger 37 (S802). For example, the operation definition information and its management state "approval processing in progress" are added as records.

Finally, each distributed ledger node 3 returns the execution result of this SC (S803).

Figure 24:
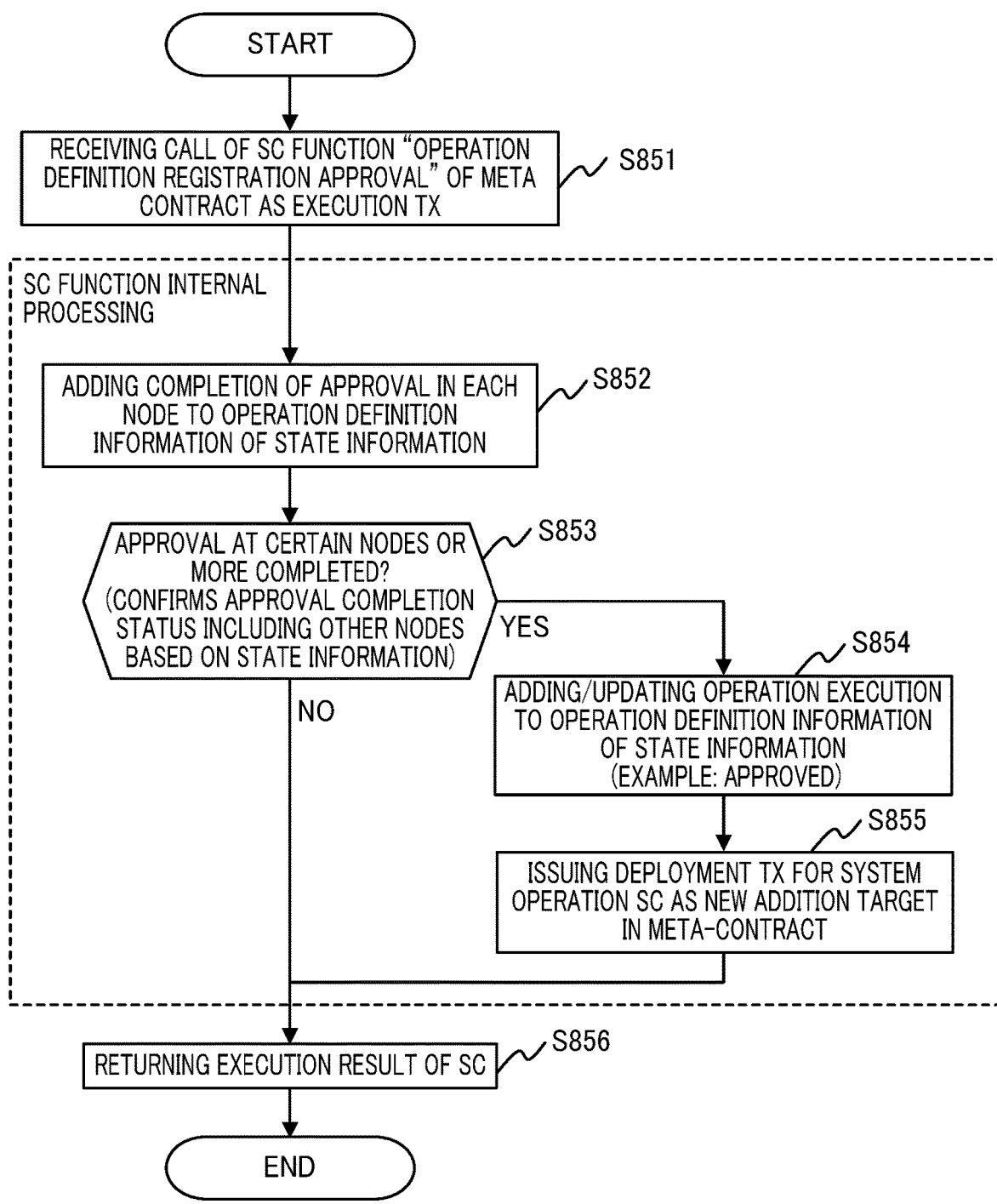
FIG. 24 is a diagram showing an example of approval processing of new registration of a system operation SC in a meta-contract for management of a system operation SC in Embodiment 6.

FIG. 24 is a diagram showing an approval process example of new registration of the system operation SC 372 in the above-described meta-contract.

In this case, each distributed ledger node 3 receives the SC function "operation definition registration approval" call of the meta-contract as the execution TX on which consensus is formed (S851).

Next, each distributed ledger node 3 performs the execution approval process at each node regarding the meta-contract according to this TX by the function of the SC execution/management unit 32. Specific internal processing is shown below.

Here, the SC execution/management unit 32 adds to the operation definition information of the state information completion of approval concerning new registration of the system operation SC 372 in the distributed ledger node 3 that issued the execution TX. (S852). For example, a pair of a node name and an approval completion time is managed as an approval completion status at each node in a column of records indicating an operation definition to be newly registered, and the information is updated.

Further, the SC execution/management unit 32 confirms the approval management completion status including those of the other nodes based on the state information, and confirms whether approval at all target nodes is completed (S853).

As a result, if the approval has been completed (S853: YES), the SC execution/management unit 32 adds the approval completion to the operation definition information of the state information (S854). Specifically, for example, the state of the record indicating the operation definition to be newly registered is changed to "approved". When the approval is completed as described above, the SC execution/management unit 32 issues a deployment TX for the system operation SC 372 that is a new addition target in the meta-contract (S855). This process is the same as in the other embodiments.

Finally, each distributed ledger node 3 returns the execution result of this SC (S856).

By preparing the meta-contract in this manner, it is possible to perform approval processing even in the process of newly adding or updating of a new system operation work.

In each of the above-described embodiments, an example in which the business network managing the system operation work is managed on the same business network as the business SC 371 is shown. However, another business network dedicated to the system operation may be constructed.

In each embodiment, the execution at each node regarding the operation work defined in the system operation SC 372 is described as an example in which the execution is made in the system operation SC 372 (for example, S403), or as an example in which the operation execution program 36 refers to the operation execution history autonomously and periodically and starts the execution upon addition of a new record of "execution in progress" (for example, explanation of FIG. 14). However, the method of the execution is not limited to the above.

As another method, the execution may be performed in an event driven manner. Specifically, in the case where a function of managing events that enables issue/notification among the distributed ledger nodes 3 or among business network participants in the distributed ledger system, it is possible that the function issues an event urging execution of the operation work within the system operation SC 372 and the operation execution program 36 in each distributed ledger node 3 executes the operation work triggered by notification of the event. In this case, in order to convey the content of the operation work, specific operation contents (for example, operation command) and a target node may be embedded in the event, and the operation execution program 36 may executes the operation work according to the information. Incidentally, the event itself may be issued immediately after completion of the SC execution, not during the SC execution. Further, in case of the event driven operation, the operation execution program 36 may register the result after completion of the execution using the SC function "operation execution completion".

Although the operation management method of the present embodiment assumes mainly system operation, since the method itself is not limited to system operation. Therefore, the method may be applied to business operation (e.g. application update). Further, although the operation management method has mainly been described as the system operation management of the distributed ledger system, application target is not limited to the distributed ledger system.

For example, it is also effective in a distributed processing system as a whole in a case where a plurality of operators wish to collectively perform operation work on a plurality of nodes (distributed processing nodes) having the same role.

Figure 25:
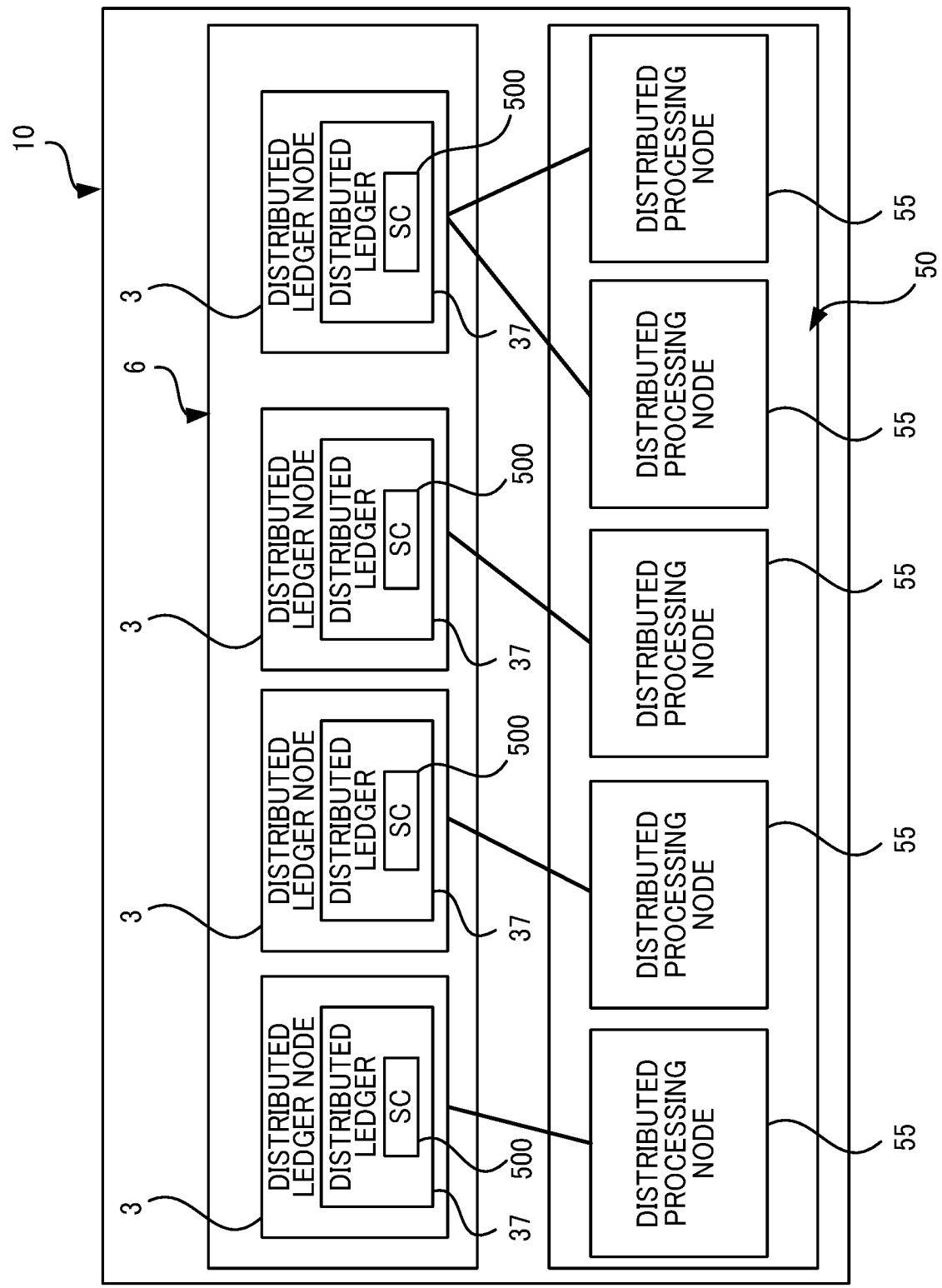
FIG. 25 is a diagram showing an example of a network configuration of an operation management system and a distributed processing system as its management target in Embodiment 7.

FIG. 25 shows an example of the network configuration of the operation management system 10 and the distributed processing system 50 as the management target in Embodiment 7.

In this case, it is assumed that each of the distributed ledger nodes 3 in the present embodiment manages the smart contract 500 for operation management of the distributed processing system 50 with the distributed ledgers 37. Therefore, the distributed ledger node 3 executes the smart contract 500 in the same way as in the above-described embodiment, thereby performing the operation work for each distributed processing node 55. In other words, in this configuration, the operation management target is not the distributed ledger 37 of each distributed ledger node 3 in the distributed ledger system 6 but each distributed processing node 55 coupled with each distributed ledger node 3.

Although the embodiments of the present invention have been described in detail with reference to the drawings, the specific configuration is not limited to the embodiments, and the present invention includes designs and the like without departing from the gist thereof.

According to the present embodiments, even in the case where there are a plurality of administrators in the distributed ledger system, it is possible to form consensus on policies and execution timings and to perform the operation work collaboratively. In other words, it is possible to carry out the operation work while assuring the nature of non-centralization and a normal level.

Further, the present embodiments can deal with the operation management of distributed processing system constructed by multiple vendors (e.g. Analysis system in which load distribution is made by a plurality of distributed processing nodes). In this case, the target of operation management is not a distributed ledger but a distributed processing node coupled with each node of a distributed ledger system. Furthermore, by embedding the operation procedure in the SC and making it procedural or scripted, it is possible to ensure uniformity of operation among multiple nodes (owned by multiple subjects).

That is, Operation management with consistent policies and timings between nodes even in a situation where there are a plurality of administrators in the distributed ledger system is realized.

By the description of the present specification, at least the following will be disclosed. That is, in the operation management method of the present embodiments, the node which has received the transaction in the distributed ledger system may be configured to execute the operation smart contract including an acceptance phase of an operation work and a confirmation phase of completion of the execution.

According to this, there is no need to wait for completion of the operation execution executed in the operation smart contract, so that the next separate execution transaction can be executed at an early stage even when the operation work takes a long time, and the business SC and the other system operation SC can be less affected. Further, it is possible to manage that performance of the operation execution at all the nodes to be subjected to the operation work is guaranteed, and the processing is completed.

Further, in the operation management method according to the present embodiment, the node which has received the transaction in the distributed ledger system may be configured to execute the operational smart contract and makes the transaction in the confirmation phase of the execution completion include an evidence of completion or information associated with the evidence of the completion.

According to this, it is possible to explicitly manage the completion of the operation work at each node.

Further, in the operation management method according to the present embodiment, it may be configured that, when the node which has received the transaction in the distributed ledger system has failed to complete execution in the confirmation phase of the execution completion as a result of execution of the operation smart contract, a predetermined recovery or re-execution process according to the operation smart contract is performed.

According to this, when the operation work has failed in the middle, recovery or the like is automatically executed according to the SC, and the recovery processing and the like can be uniformly performed.

Further, in the operation management method of the present embodiment, the node that has received the transaction in the distributed ledger system is configured to execute the operation smart contract including an approval phase in at least one of registration and execution of a smart contract.

According to this, approval processing as a higher-level concept (business operation or system operation level) than consensus formation processing (protocol level) as to whether a TX is to be accepted or not is made possible. For example, it is effective when preliminary preparation is needed prior to execution of the operation work at each node.

Further, in the operation management method of the present embodiment, a node which is not in charge of executing a business smart contract for business among the two or more predetermined nodes may be configured to participate in a network and executes the operation smart contract as a participant of a business network constituted by the distributed ledger system or a node participating in consensus formation of the operation smart contract.

According to this, since the node for operation management participates in the business network, it is effective when plural vendors that do not participate in the business participate only in the system operation work. Since a vendor that does not participate in the business can also carry out the operation work while forming a consensus with the organization that performs the work, multivendor operation in a non-centralized manner is realized.

Further, in the operation management method of the present embodiment, the node that has received the transaction in the distributed ledger system may be configured to issue a deployment transaction for adding/updating the operation smart contract and an operation execution transaction for executing the operation work defined by the operation smart contract with respect to the operation smart contract, and to verify correctness of an operation execution program to be used for the operation work at the time of issuing at least one of the deployment transaction and the operation execution transaction.

According to this, by verifying the correctness of the operation work program, when an external operation work program is used, execution of unexpected operation work due to alteration of the program, a difference in version or setting, and failure of placement or the like is prevented, and it is possible to further enhance the uniformity of the operation work.

Further, in the operation management method of the present embodiment, the operation execution program stored in the node which has received the transaction in the distributed ledger system or accessible to the node may be configured to execute the operation work according to the predetermined operation smart contract.

According to this, the system configuration is such that the node for operation management participates in the network, which is effective when plural vendors that do not participate in the business participate only in the system operation work. Since a vendor that does not participate in the business can also carry out the operation work while forming a consensus with the organization that performs the work, multivendor operation in a non-centralized manner is realized.

Further, in the operation management method of the present embodiment, a node which has executed the operation smart contract in the two or more predetermined nodes may be configured to issue an event related to the operation work indicating that the operation smart contract has been executed at the time of execution of the operation smart contract, and an operation execution program which is held by the two or more predetermined nodes or accessible to the node may be configured to execute the operation work according to the operation smart contract in response to the event.

According to this, the execution of the operation smart contract at a predetermined node triggers operation smart contract at another node, which leads to accurate synchronization of the operation work at each node constituting the distributed ledger system.

Further, in the operation management method of the present embodiment, a specific operation work procedure to be executed may be embedded in the event, and the operation execution program may be configured to execute the operation work according to the embedded operation work.

According to this, a specific operation work procedure is naturally executed by executing the smart contract for operation management.

Further, in the operation management method according to the present embodiment, the plurality of nodes in the distributed ledger system may be configured to manage a smart contract for operation management of a distributed processing system different from the distributed ledger system by a distributed ledger, to execute the smart contract, and to perform operation management of the distributed processing node in the distributed processing system.

According to this, it becomes possible to apply the operation management of this embodiment to the distributed processing system, and it is possible to perform operation management with uniform policy and timing on distributed processing nodes for a wide range of industries and businesses.

REFERENCE SIGNS LIST

1 Network
2 Physical communication line
3 Distributed ledger node
10 Operation management system
100 I/F
101 Processor
102 Memory
103 Data bus
110 Program
31 Consensus management unit
311 Network protocol unit
32 Smart contract execution/management unit (SC execution/management unit)
33 Member management unit
34 Transaction management unit
35 Transaction issuing unit
36 Operation execution program
37 Distributed ledger
371 Business smart contract (Business SC)
372 Operation smart contract (System operation SC)
38 Participating member management information
4 Client node
41 Business application
42 Operation management application
5 Operation management node
6 Distributed ledger system
50 Distributed processing system
55 Distributed processing node

CITATION LIST

Non-Patent Literature

NPL 1: "A Peer-to-Peer Electronic Cash System", [online], [Searched on Mar. 31, 2017], Internet <URL: https://bitcoin.org/bitcoin.pdf>
NPL 2: "Ethereum White Paper", [online], [Searched on Mar. 31, 2017], Internet <URL:

https://github.com/ethereum/wiki/wiki/[English]-White-Paper>

NPL 3: "Hyperledger Fabric", [online], [Searched on Mar. 31, 2017], Internet <URL: http://hyperledger-fabric.readthedocs.io/en/latest/>

The invention claimed is:

1. A system operations management method of a distributed ledger system comprising a plurality of nodes, each node including a memory coupled to a processor, the method comprising the steps of:

managing, by each of at least two or more predetermined nodes in the plurality of nodes, a system operations smart contract for executing system operations to the distributed ledger system itself or to nodes themselves comprising the distributed ledger system, the system operations smart contract holding at least any one of an identifier identifying a type of a system operation and procedure information for executing the system operation corresponding to the type of the system operation;

when at least one node in the two or more predetermined nodes receives a transaction of the system operations smart contract, executing, by the node which has received the transaction, the system operations smart contract; and in response to the execution of the system operations smart contract, executing, by either of the node or a system operations execution program associated with the node, the system operations execution program stored on a memory on a node, a system operation work according to at least any one of the identifier identifying the type of the system operation held in the system operations smart contract and the procedure information of the system operation for a node being a target of the system operation.

2. The system operations management method according to claim 1, wherein the system operations smart contract holds a data structure managing an execution history of the operation work for the identifier identifying the type of the operation, and wherein the system operations smart contract includes an acceptance phase of an operation work and a confirmation phase of completion of the execution, and, as an internal processing of the system operations smart contract, includes an individual registration step registering each completion of the execution in each node in the execution history in the confirmation phase of completion of the execution and a completion judgement step judging the completion of the entire operation work by confirming the registration status referring to the registration of the completion of the execution including those at the other nodes in the execution history.

3. The system operations management method according to claim 2, wherein the node which has received the transaction in the distributed ledger system executes the operational smart contract and makes the transaction in the confirmation phase of the execution completion include an evidence of completion or information associated with the evidence of the completion, and as an internal processing of the system operations smart contract, the node which has received the transaction in the distributed ledger system registers an evidence of completion at each of the nodes at the individual registration step as the execution history or as information linked with the execution history, and utilizes the evidence of the completion to the completion judgement of the entirety of the operation work as a condition for the judgement of the completion at the completion judgement step.

4. The system operations management method according to claim 3, wherein the system operations smart contract further holds recovery procedure information corresponding to an identifier identifying a type of an operation, when the node which has received the transaction in the distributed ledger system has failed to complete execution in the confirmation phase of the execution completion as a result of execution of the system operations smart contract, a predetermined recovery or re-execution process according to the recovery procedure information in the system operations smart contract may be performed.

5. The system operations management method according to claim 1, wherein the system operations smart contract holds a data structure for managing an execution history of at least any one of registration of an operation work and execution of an operation work for each identifier identifying a type of an operation, and wherein the system operations smart contract includes an approval phase in at least one of registration and execution of a smart contract, and includes, as an internal processing of the system operations smart contract, an individual registration step registering each completion of the execution in each node in the execution history in the confirmation phase of completion of the execution and a completion judgement step judging the completion of the entire operation work by confirming the registration status referring to the registration of the completion of the execution including those at the other nodes in the execution history.

6. The system operations management method according to claim 1, wherein a node which is not in charge of executing a business smart contract for business among the two or more predetermined nodes participates in a network and executes the system operations smart contract as a participant of a business network constituted by the distributed ledger system or a node participating in consensus formation of the system operations smart contract.

7. The system operations management method according to claim 1, wherein the node that has received the transaction in the distributed ledger system issues a deployment transaction for adding/updating the system operations smart contract and an operation execution transaction for executing the operation work defined by the system operations smart contract with respect to the system operations smart contract, and verifies correctness of the system operations execution program to be used for the operation work at the time of issuing at least one of the deployment transaction and the operation execution transaction by calculating a hash value of the system operations execution program and judging based on whether or not the hush value matches a hush value calculated in advance and held as an internal variable of the system operations smart contract or a hush value related to the system operations execution program on the other node.

8. The system operations management method according to claim 1, wherein a node which has executed the system operations smart contract in the two or more predetermined nodes issues an event related to the operation work including an identifier identifying at least the content of the operation indicating that the system operations smart contract has been executed at the time of execution of the system operations smart contract, and the system operations execution program which is held by the two or more predetermined nodes or associated with the node executes the operation work according to at least the content identified by the identifier in response to the event.

9. The system operations management method according to claim 1, wherein, as at least a part of the operation procedure information, at least any one of one or more operation command string, a program to be called, a source code describing operation content, and information of the node to be operated is embedded in the event, and the system operations execution program executes the operation work according to the embedded procedure information.

10. The system operations management method according to claim 1, wherein the plurality of nodes in the distributed ledger system manage a smart contract for operation management of a distributed processing system different from the distributed ledger system by a distributed ledger, execute the smart contract, and perform operation management of the distributed processing node in the distributed processing system.

11. A system operations management system, comprising:
a plurality of nodes of a distributed ledger system, each node having a processor coupled to a memory,
wherein each of at least two or more predetermined nodes in the plurality of nodes manages a system operations smart contract for executing system operations to the distributed ledger system itself or to nodes themselves comprising the distributed ledger system the system operations smart contract holding at least any one of an identifier identifying a type of a system operation and procedure information for executing the system operation corresponding to the type of the system operation;
when at least one node in the two or more predetermined nodes receives a transaction of the system operations smart contract, the node which has received the transaction executes the system operations smart contract, and
in response to the execution of the system operations smart contract, either of the node or a system operations execution program associated with the node, the system operations execution program stored on a memory on a node, executes a system operation work according to at least any one of the identifier identifying the type of the system operation held in the system operations smart contract and the procedure information of the system operation for a node being a target of the system operation.

12. An system operations management method of a distributed ledger system comprising a plurality of nodes, each node including a memory coupled to a processor, the method comprising the steps of:
managing, by each of at least two or more predetermined nodes in the plurality of nodes, a system operations smart contract for executing system operations to the distributed ledger system itself or to nodes themselves comprising the distributed ledger system, the system operations smart contract holding at least any one of an identifier identifying a type of a system operation and procedure information for executing the system operation corresponding to the type of the system operation;
when at least one node in the two or more predetermined nodes receives a transaction of the system operations smart contract, executing, by the node which has received the transaction, the system operations smart contract; and
in response to the execution of the system operations smart contract, executing, by system operations execution programs, each system operations execution program is stored in a memory on a node comprising the distributed ledger system or in a memory on a node not comprising the distributed ledger system but associated with at least any one of the nodes comprising the distributed ledger system, a system operation work according to at least any one of the identifier identifying the type of the system operation held in the system operations smart contract and the procedure information of the system operation to each node being a target of the system operation.

13. The system operations management method according to claim 12, wherein the system operations smart contract or a node which has executed the system operations smart contract in the two or more predetermined nodes issues an event related to the system operation work including an identifier identifying at least the content of the system operation indicating that the system operations smart contract has been executed at the time of execution of the system operations smart contract and target node information to identify nodes subject to the system operation, and the system operations execution programs determine which nodes are the target nodes for the system operation by each system operations execution program according to at least the target node information, and execute the system operation work according to at least the content identified by the identifier, in response to the event.

* * * * *